United States Patent
Yamanaka et al.

(10) Patent No.: US 12,420,519 B2
(45) Date of Patent: Sep. 23, 2025

(54) PRESSURE SENSITIVE ADHESIVE PARTICLE, CARTRIDGE, APPARATUS FOR PRODUCING PRINTED MATERIAL, METHOD FOR PRODUCING PRINTED MATERIAL, PRINTED MATERIAL, SHEET FOR PRODUCING PRINTED MATERIAL, AND METHOD FOR PRODUCING SHEET FOR PRODUCING PRINTED MATERIAL

(71) Applicant: FUJIFILM Business Innovation Corp., Tokyo (JP)

(72) Inventors: Kiyohiro Yamanaka, Kanagawa (JP); Sumiaki Yamasaki, Kanagawa (JP); Satoshi Kamiwaki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 636 days.

(21) Appl. No.: 17/501,031

(22) Filed: Oct. 14, 2021

(65) Prior Publication Data
US 2022/0234326 A1 Jul. 28, 2022

(30) Foreign Application Priority Data
Jan. 19, 2021 (JP) ................. 2021-006586

(51) Int. Cl.
*B31F 5/04* (2006.01)
*B31F 5/00* (2006.01)
(Continued)

(52) U.S. Cl.
CPC ............... *B31F 5/04* (2013.01); *B31F 5/005* (2013.01); *B41F 13/56* (2013.01); *B41M 5/502* (2013.01);
(Continued)

(58) Field of Classification Search
CPC ........ B31F 5/04; C09J 7/385; C09J 2301/302; C09J 2203/102; C09J 2425/00;
(Continued)

(56) References Cited

U.S. PATENT DOCUMENTS

| 8,394,888 B2 * | 3/2013 | Morino ..................... C09J 7/385 524/556 |
| 2013/0030110 A1 | 1/2013 | Okada et al. |

(Continued)

FOREIGN PATENT DOCUMENTS

| EP | 3 147 339 A1 | 3/2017 |
| JP | 8-30020 A | 2/1996 |

(Continued)

OTHER PUBLICATIONS

Extended European Search Report dated May 25, 2022 from the European Patent Office in EP Application No. 21211585.1.
(Continued)

*Primary Examiner* — Mark F. Huff
*Assistant Examiner* — Boone Alexander Evans
(74) *Attorney, Agent, or Firm* — Sughrue Mion, PLLC

(57) ABSTRACT

A pressure sensitive adhesive particle includes a styrene resin that contains, as polymerization components, styrene and a vinyl monomer other than styrene; and a (meth) acrylate resin that contains, as polymerization components, at least two (meth)acrylates that account for 90 mass % or more of all polymerization components of the (meth)acrylate resin, in which the pressure sensitive adhesive particle has a sea phase that contains the styrene resin, and island phases that are dispersed in the sea phase and contain the (meth)acrylate resin, the pressure sensitive adhesive particle has at least two glass transition temperatures, and a difference between the lowest glass transition temperature and the highest glass transition temperature is 30° C. or more, and in
(Continued)

a cross section of the pressure sensitive adhesive particle, an area ratio of the island phases is 30% or more and 85% or less.

20 Claims, 5 Drawing Sheets

(51) Int. Cl.
  *B41F 13/56* (2006.01)
  *B41M 5/50* (2006.01)
  *B65H 37/04* (2006.01)
  *B65H 37/06* (2006.01)
  *C09J 7/10* (2018.01)
  *C09J 7/38* (2018.01)

(52) U.S. Cl.
  CPC ............. *B65H 37/04* (2013.01); *B65H 37/06* (2013.01); *C09J 7/10* (2018.01); *C09J 7/385* (2018.01); *C09J 2203/102* (2013.01); *C09J 2301/302* (2020.08); *C09J 2425/00* (2013.01); *C09J 2433/00* (2013.01)

(58) Field of Classification Search
  CPC ...... C09J 2433/00; B41F 13/56; B41M 5/502; B65H 37/04; B65H 37/06
  See application file for complete search history.

(56) References Cited

U.S. PATENT DOCUMENTS

| | | | |
|---|---|---|---|
| 2018/0275544 A1* | 9/2018 | Chonan | G03G 9/09364 |
| 2019/0292412 A1 | 9/2019 | Yamasaki et al. | |
| 2021/0018854 A1* | 1/2021 | Ishizuka | G03G 9/09 |

FOREIGN PATENT DOCUMENTS

| | | | |
|---|---|---|---|
| JP | 2007-229993 A | 9/2007 | |
| JP | 2010-266511 A | 11/2010 | |
| JP | 2012-188512 A | 10/2012 | |
| JP | 2018-002889 A | 1/2018 | |
| JP | 2018-049150 A | 3/2018 | |
| JP | 2018-049151 A | 3/2018 | |
| JP | 2018-163198 A | 10/2018 | |
| JP | 2018-163256 A | 10/2018 | |
| JP | 6468727 B2 | 2/2019 | |
| JP | 2019-167471 A | 10/2019 | |

OTHER PUBLICATIONS

Japanese Office Action dated Aug. 6, 2024 in application No. 2021-006586.

* cited by examiner

PRESSURE SENSITIVE ADHESIVE PARTICLE, CARTRIDGE, APPARATUS FOR PRODUCING PRINTED MATERIAL, METHOD FOR PRODUCING PRINTED MATERIAL, PRINTED MATERIAL, SHEET FOR PRODUCING PRINTED MATERIAL, AND METHOD FOR PRODUCING SHEET FOR PRODUCING PRINTED MATERIAL

CROSS-REFERENCE TO RELATED APPLICATIONS

This application is based on and claims priority under 35 USC 119 from Japanese Patent Application No. 2021-006586 filed Jan. 19, 2021.

BACKGROUND

(i) Technical Field

The present disclosure relates to a pressure sensitive adhesive particle, a cartridge, an apparatus for producing a printed material, a method for producing a printed material, a printed material, a sheet for producing a printed material, and a method for producing a sheet for producing a printed material.

(ii) Related Art

Japanese Unexamined Patent Application Publication No. 2012-188512 describes a water-dispersed pressure-sensitive adhesive composition that contains two acrylic polymers in an aqueous solvent.

Japanese Unexamined Patent Application Publication No. 2018-002889 describes an adhesive material that satisfies the formula: "20° C.≤T (1 MPa)–T (10 MPa)" (where T (1 MPa) represents a temperature at which the viscosity is $10^4$ Pa·s at an applied pressure of 1 MPa, and T (10 MPa) represents a temperature at which the viscosity is $10^4$ Pa·s at an applied pressure of 10 MPa).

Japanese Unexamined Patent Application Publication No. 2018-163198 describes a pressure-fixing toner that contains a styrene resin and a (meth)acrylate resin having a glass transition temperature at least 30° C. lower than the glass transition temperature of the styrene resin, that has a sea-island structure having a sea containing the styrene resin and islands containing the (meth)acrylate resin, and that includes a core that includes islands having a long diameter of 200 nm or more and 500 nm or less and a shell layer that covers the core and contains a resin having a glass transition temperature of 50° C. or higher.

Japanese Patent No. 6468727 discloses a water-dispersed pressure-sensitive adhesive composition that contains an acrylic polymer (A) which is a polymer of a monomer material (A) and an acrylic polymer (B) which is a polymer of a monomer material (B), in which the acrylic polymer (B) has a glass transition temperature of 0° C. or higher and has a weight average molecular weight of more than $0.3 \times 10^4$ but not more than $5 \times 10^4$, the acrylic polymer (A) has a weight average molecular weight of $40 \times 10^4$ or more, the difference between the glass transition temperatures of the acrylic polymer (B) and the acrylic polymer (A) is 70° C. or more, and the monomer material (B) contains 3 wt % or more and 20 wt % or less of a carboxyl group-containing monomer.

Japanese Unexamined Patent Application Publication No. 2007-229993 describes a pressure-bonding postcard paper sheet that includes an adhesive layer containing an acrylic acid alkyl methacrylate copolymer.

SUMMARY

Aspects of non-limiting embodiments of the present disclosure relate to a pressure sensitive adhesive particle that has a sea phase containing a styrene resin and island phases that contain a (meth)acrylate resin and that has adhesiveness that releasably bonds surfaces of a recording medium to each other is excellent compared to a pressure sensitive adhesive particle that has a sea phase containing a styrene resin and island phases that contain a (meth)acrylate resin in which the area of the island phases in a cross section of the pressure sensitive adhesive particle is less than 30%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a pressure sensitive adhesive particle including a styrene resin that contains, as polymerization components, styrene and a vinyl monomer other than styrene; and a (meth)acrylate resin that contains, as polymerization components, at least two (meth)acrylates that account for 90 mass % or more of all polymerization components of the (meth)acrylate resin, in which the pressure sensitive adhesive particle has a sea phase that contains the styrene resin, and island phases that are dispersed in the sea phase and contain the (meth)acrylate resin, the pressure sensitive adhesive particle has at least two glass transition temperatures, and a difference between the lowest glass transition temperature and the highest glass transition temperature is 30° C. or more, and in a cross section of the pressure sensitive adhesive particle, an area ratio of the island phases is 30% or more and 85% or less.

BRIEF DESCRIPTION OF THE DRAWINGS

Exemplary embodiments of the present disclosure will be described in detail based on the following figures, wherein.

DETAILED DESCRIPTION

Figure 1:
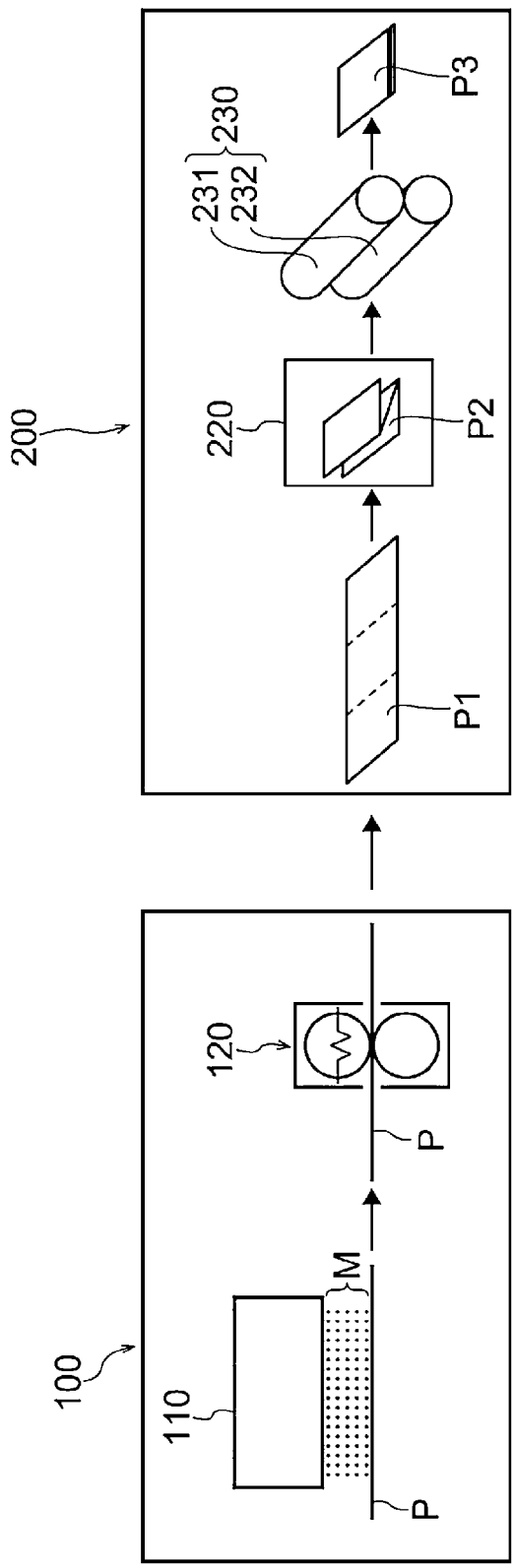
FIG. 1 is a schematic diagram illustrating one example of an apparatus for producing a printed material according to an exemplary embodiment.

Exemplary embodiments of the present disclosure will now be described. These descriptions and examples are merely illustrative exemplary embodiments and do not limit the scope of the exemplary embodiments.

In the present disclosure, a numerical range that uses "to" indicates a range that includes a figure that precedes "to" and a figure that follows "to" as the minimum value and the maximum value, respectively.

In numerical ranges described stepwise, the upper limit or the lower limit of one numerical range may be substituted with an upper limit or a lower limit of a different numerical range also described stepwise. In addition, in any numerical range described in the present disclosure, the upper limit or the lower limit of the numerical range may be substituted with a value indicated in Examples.

In the present disclosure, the term "step" indicates not only an independent step but also any feature that achieves the intended purpose of a certain step although such a feature may not be clearly distinguishable from other steps.

When exemplary embodiments of the present disclosure are described by referring to the drawings, the features of the exemplary embodiments are not limited to those illustrated in the drawings. Furthermore, the size of components illustrated in the drawings is schematic, and the relative size relationship between the components it not limited to what is illustrated in the drawings.

In the present disclosure, each component may contain more than one corresponding substances. In the present disclosure, when the amount of a component in a composition is referred and when there are two or more substances that correspond to that component in the composition, the amount is the total amount of the two or more substances in the composition unless otherwise noted.

In the present disclosure, particles corresponding to each component may contain more than one types of particles.

When there are more than one types of particles corresponding to one component in the composition, the particle diameter of each component is a particle diameter of a mixture of the more than one types of particles present in the composition unless otherwise noted.

In the present disclosure, the notation "(meth)acryl" means "acryl" or "methacryl".

In the present disclosure, a printed material formed by folding a recording medium and bonding the opposing surfaces thereof or a printed material formed by stacking two or more recording media on top of each other and bonding the opposing surfaces thereof is referred to as a "pressure-bonded printed material".

Pressure Sensitive Adhesive Particle

A pressure sensitive adhesive particle according to an exemplary embodiment includes a styrene resin that contains, as polymerization components, styrene and a vinyl monomer other than styrene; and a (meth)acrylate resin that contains, as polymerization components, at least two (meth)acrylates that account for 90 mass % or more of all polymerization components of the (meth)acrylate resin, in which: the pressure sensitive adhesive particle has a sea phase that contains the styrene resin, and island phases that are dispersed in the sea phase and contain the (meth)acrylate resin; the pressure sensitive adhesive particle has at least two glass transition temperatures, and a difference between the lowest glass transition temperature and the highest glass transition temperature is 30° C. or more; and in a cross section of the pressure sensitive adhesive particle, an area ratio of the island phases is 30% or more and 85% or less.

The pressure sensitive adhesive particle of the exemplary embodiment softens under pressure and releasably bonds surfaces of recording media.

The pressure sensitive adhesive particle of this exemplary embodiment undergoes pressure-induced phase transition due to its thermal properties, namely, the pressure sensitive adhesive particle "has at least two glass transition temperatures, and the difference between the highest glass transition temperature and the lowest glass transition temperature is 30° C. or more". In the present disclosure, a pressure sensitive adhesive particle that undergoes pressure-induced phase transition refers to a pressure sensitive adhesive particle that satisfies formula 1 below:

$$10° C. \leq T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining the temperature T1 and the temperature T2 is described below.

The pressure sensitive adhesive particle of this exemplary embodiment readily undergoes pressure-induced phase transition and exhibits excellent adhesiveness since the pressure sensitive adhesive particle contains "a styrene resin that contains, as polymerization components, styrene and a vinyl monomer other than styrene" and "a (meth)acrylate resin that contains, as polymerization components, at least two (meth)acrylates that account for 90 mass % or more of all polymerization components of the (meth)acrylate resin". The mechanism behind this is presumably as follows.

In general, a styrene resin and a (meth)acrylate resin have low compatibility to each other, and thus it is considered that a pressure sensitive adhesive base particle contains these resins in a phase separated state. Moreover, it is considered that when a pressure sensitive adhesive base particle is pressurized, the (meth)acrylate resin having a relatively low glass transition temperature is fluidized first, and this fluidization affects the styrene resin, resulting in fluidization of both resins. It is also considered that when the two resins in the pressure sensitive adhesive base particle solidify and form a resin layer as the pressure is decreased after the two resins have fluidized under pressure, a phase separated state is again formed due to their low compatibility.

It is assumed that a (meth)acrylate resin that contains at least two (meth)acrylates as polymerization components is easily fluidizable under pressure because there are at least two types of ester groups bonded to the main chain and thus the degree of molecular alignment in a solid state is low compared to a homopolymer of a (meth)acrylate. Moreover, it is assumed that when the (meth)acrylates account for 90 mass % or more of all polymerization components, at least two types of ester groups are present at a high density; thus, the degree of molecular alignment in a solid state decreases further, and thus the resin becomes more easily fluidizable under pressure. Thus, it is assumed that the pressure sensitive adhesive particle of this exemplary embodiment more readily fluidizes under pressure, in other words, undergoes pressure-induced phase transition, compared to a pressure sensitive adhesive particle that contains a homopolymer of a (meth)acrylate as the (meth)acrylate resin.

In addition, it is assumed that a (meth)acrylate resin that contains, as polymerization components, at least two (meth)acrylates that account for 90 mass % or more of all polymerization components has a low degree of molecular alignment during re-solidification also, and, thus, a microphase separation occurs with the styrene resin. The finer the state of phase separation between the styrene resin and the (meth)acrylate resin, the higher the uniformity of the state of the adhesive surface to an adherend, and the more excellent the adhesiveness. Thus, it is assumed that the pressure sensitive adhesive particle of this exemplary embodiment has excellent adhesiveness compared to a pressure sensitive adhesive particle that contains a homopolymer of a (meth)acrylate as the (meth)acrylate resin.

In the pressure sensitive adhesive particle of this exemplary embodiment, a styrene resin and a (meth)acrylate resin co-exist in a phase separated state. In the pressure sensitive adhesive particle of this exemplary embodiment, the styrene resin is contained in a relatively continuous state, and the (meth)acrylate resin is contained in a relatively discontinuous state. The continuous phase containing the styrene resin is the "sea phase", and the dispersed phases that contain the (meth)acrylate resin are the "island phases". In this exemplary embodiment, a structure that has a sea phase, which is a continuous phase, and island phases, which are dispersed phases, is referred to as a sea-island structure.

The pressure sensitive adhesive particle according to this exemplary embodiment has a sea phase that contains a styrene resin and island phases that are dispersed in the sea phase and contain the (meth)acrylate resin, and the area ratio of the island phases in a cross section of the pressure sensitive adhesive particle is 30% or more and 85% or less. When the area ratio of the island phases is 30% or more, the pressure sensitive adhesive particle easily undergoes pressure-induced phase transition, and thus exhibits excellent adhesiveness that enables releasable bonding between the surfaces of the recording medium. When the area ratio of the island phases is 85% or less, excellent mechanical strength suitable for the pressure sensitive adhesive particle (for example, the strength that withstands deformation during stirring in a developing device) is exhibited. From these viewpoints, the area ratio of the island phases in a cross section of the pressure sensitive adhesive particle is preferably 35% or more and 80% or less and more preferably 40% or more and 75% or less.

The average diameter of the island phases contained in the pressure sensitive adhesive particle may be 200 nm or more and 500 nm or less. When the average diameter of the island phases is 500 nm or less, the pressure sensitive adhesive particle easily undergoes pressure-induced phase transition, and thus exhibits excellent adhesiveness that enables releasable bonding between the surfaces of the recording medium. When the average diameter of the island phases is 200 nm or more, excellent mechanical strength suitable for the pressure sensitive adhesive particle (for example, the strength that withstands deformation during stirring in a developing device) is exhibited. From these viewpoints, the average diameter of the island phases is more preferably 220 nm or more and 450 nm or less and yet more preferably 250 nm or more and 400 nm or less.

The average number of island phases per pressure sensitive adhesive particle in a cross section of the pressure sensitive adhesive particle may be 20 or more and 4000 or less. When the average number of island phases is 20 or more, the pressure sensitive adhesive particle easily undergoes pressure-induced phase transition, and thus exhibits excellent adhesiveness that enables releasable bonding between the surfaces of the recording medium. When the average number of island phases is 4000 or less, excellent mechanical strength suitable for the pressure sensitive adhesive particle (for example, the strength that withstands deformation during stirring in a developing device) is exhibited. From these viewpoints, the average number of island phases per pressure sensitive adhesive particle is preferably 35 or more and 2000 or less and more preferably 50 or more and 1000 or less.

In a cross section of the pressure sensitive adhesive particle, the island phases may satisfy the following requirements (1) and (2).

Requirement (1): The area ratio As1(%) of the island phases in a first region and the area ratio As2(%) of the island phases in a second region have a relationship of $0.70 \leq As2/As1 \leq 1.20$.

Requirement (2): The area ratio As1(%) of the island phases in the first region and the area ratio As3(%) of the island phases in a third region have a relationship of $0.70 \leq As3/As1 \leq 1.20$.

The first region, the second region, and the third region are regions in a cross section of the pressure sensitive adhesive particle and are formed by dividing a portion that spans from a position 550 nm deep from a surface to a center of gravity equally into three parts that respectively correspond to the first region, the second region, and the third region in order of proximity to the center of gravity.

Figure 5:
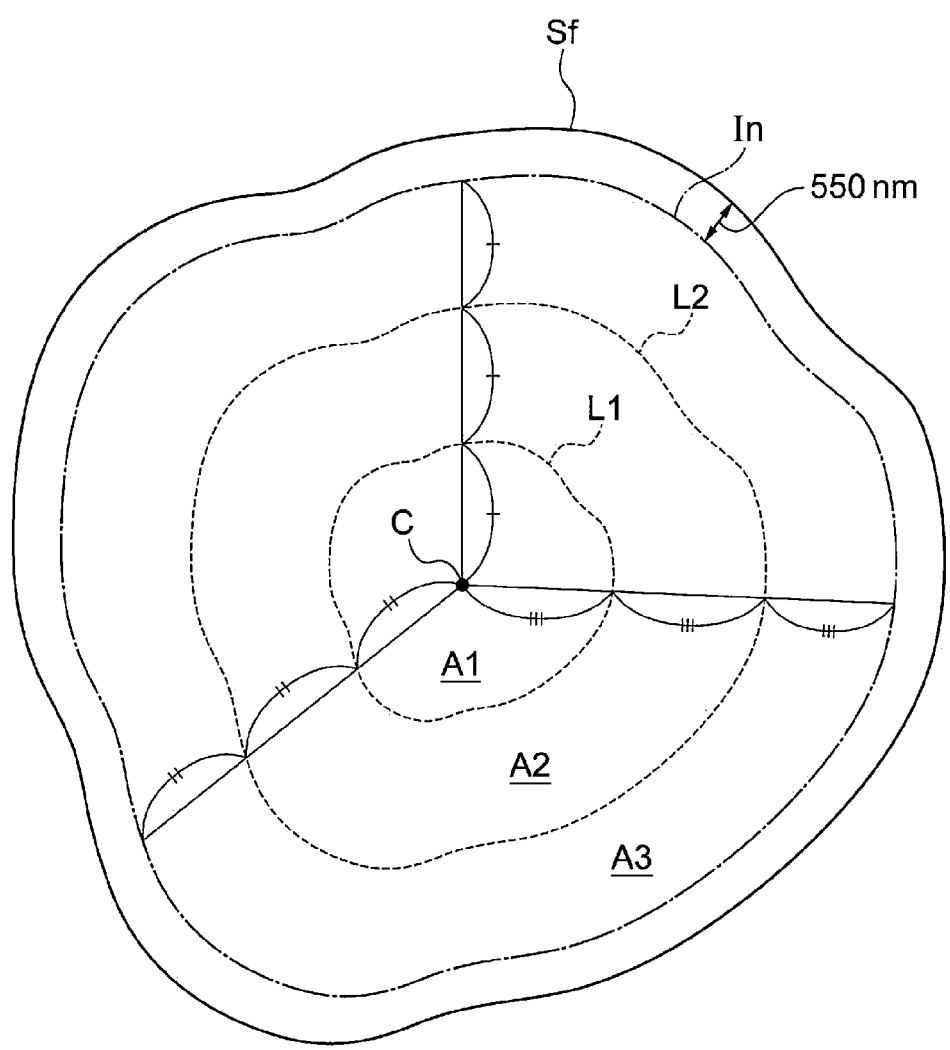
FIG. 5 is a schematic cross-sectional view illustrating a first region, a second region, and a third region of a pressure sensitive adhesive particle.

The first region, the second region, and the third region will now be described with reference to FIG. 5. FIG. 5 is a schematic cross-sectional view of a pressure sensitive adhesive particle. The first region, the second region, and the third region are determined by using image analyzing software as follows.

A curve In is drawn at a position 550 nm deep from a surface Sf of the pressure sensitive adhesive particle.

The center of gravity C of the cross section of the pressure sensitive adhesive particle is determined. When the number of pixels within the contour of the pressure sensitive adhesive particle is represented by n and the xy coordinates of the pixels are represented by $(x_i, y_i)$ (i=1, 2, . . . , n), the x coordinate of the center of gravity $C=(x_1+x_2+\ldots+x_n)/n$ and the y coordinate of the center of gravity $C=(y_1+y_2+\ldots+y_n)/n$.

The distance between the center of gravity C and the curve In is trisected, a curve L1 is drawn one third of that distance from the center of gravity C, and a curve L2 is drawn one third of that distance from the curve In.

The region surrounded by the curve L1 is a first region A1, the region surrounded by the curve L1 and the curve L2 is a second region A2, and the region surrounded by the curve L2 and the curve In is a third region A3.

The area ratio of the island phases in the first region A1 is As1(%), the area ratio of the island phases in the second region A2 is As2(%), and the area ratio of the island phases in the third region A3 is As3(%).

As2/As1 and As3/As1 are indices that indicate the dispersed state of the island phases, and the closer the index is to 1, the more evenly dispersed are the island phases. From the viewpoints of facilitating pressure-induced phase transfer of the pressure sensitive adhesive particle and improving the adhesiveness that enables releasable bonding between the surfaces of the recording medium, As2/As1 and As3/As1 may each be close to 1 and are ideally each 1.

In a cross section of the pressure sensitive adhesive particle, the island phases may satisfy the following requirements (1') and (2').

Requirement (1'): The area ratio As1(%) of the island phases in the first region and the area ratio As2(%) of the island phases in the second region have a relationship of $0.85 \leq As2/As1 \leq 1.15$.

Requirement (2'): The area ratio As1(%) of the island phases in the first region and the area ratio As3(%) of the island phases in the third region have a relationship of $0.85 \leq As3/As1 \leq 1.15$.

In a cross section of the pressure sensitive adhesive particle, the island phases may satisfy the following requirements (1") and (2").

Requirement (1"): The area ratio As1(%) of the island phases in the first region and the area ratio As2(%) of the island phases in the second region have a relationship of $0.90 \leq As2/As1 \leq 1.10$.

Requirement (2"): The area ratio As1(%) of the island phases in the first region and the area ratio As3(%) of the island phases in the third region have a relationship of $0.90 \leq As3/As1 \leq 1.10$.

Examples of the method for controlling the area ratio, average diameter, average number, and dispersed state of the island phases to be within the respective ranges described above through the method of producing the pressure sensitive adhesive base particles described below include increasing or decreasing the amount of the (meth)acrylate resin relative to the amount of the styrene resin, increasing or decreasing the rate of elevating the temperature of the resin particle dispersion, and increasing or decreasing the time of maintaining a high temperature in the step of fusing and coalescing aggregated resin particles.

Method for Measuring Form of Island Phases

Identifying the sea-island structure and measuring the dimensions and area of the island phases are conducted as follows.

(1) Capturing Images of Cross Sections of Pressure Sensitive Adhesive Particles

Pressure sensitive adhesive particles are embedded in an epoxy resin, a cross section is prepared by using a diamond knife or the like, and the prepared cross section is stained with osmium tetroxide or ruthenium tetroxide in a desiccator. The stained cross section is imaged with a scanning electron microscope (SEM).

While the SEM image contains particle cross sections of various sizes, those particle cross sections which have a long diameter equal to or larger than 85% of the volume-average particle diameter are extracted, and, from among the extracted particle cross sections, one hundred particle cross sections are selected at random. In the present disclosure, the long diameter refers to the length of the longest straight line among all straight lines that connect two points on the contour line.

The reason for extracting the particle cross sections having a long diameter equal to or larger than 85% of the volume-average particle diameter is that the particle sections having a long diameter less than 85% of the volume-average particle diameter are highly possibly the sections of end portions of the particles that do not satisfactorily reflect the dispersed state of the island phases in the pressure sensitive adhesive particles.

(2) Distinguishing Between Sea Phase and Island Phases

The sea phase and the island phases of the sea-island structure are distinguished by the shade created by the degree of staining with osmium tetroxide or ruthenium tetroxide, and the presence or absence of the sea-island structure as well as the presence or absence of the sea phase and the island phases is identified by the shade.

(3) Average Number of Island Phases Per Pressure Sensitive Adhesive Particle

The total number of island phases included in the aforementioned one hundred particle sections is counted and divided by 100 to obtain the average number of island phases per pressure sensitive adhesive particle.

(4) Average Diameter of Island Phases

The long diameters of all island phases included in the aforementioned one hundred particle sections are measured, and the arithmetic average thereof is assumed to be the average diameter (nm) of the island phases.

(5) Area Ratio of Island Phases

In the aforementioned one hundred particle sections, the total area of the one hundred particles and the total area of the island phases included in the one hundred particles are determined, the ratio of the total area of the island phases to the total area of the particles is calculated, and the result is assumed to be the area ratio (%) of the island phases.

(6) As1, As2, and As3

In the aforementioned one hundred particle sections, the total area of the first regions in the one hundred particles and the total area of the island phases included in the first regions are determined, the ratio of the total area of the island phases included in the first regions to the total area of the first regions is calculated, and the result is assumed to be the area ratio As1(%).

Similarly, in the aforementioned one hundred particle sections, the total area of the second regions in the one hundred particles and the total area of the island phases included in the second regions are determined, the ratio of the total area of the island phases included in the second regions to the total area of the second regions is calculated, and the result is assumed to be the area ratio As2(%).

Similarly, in the aforementioned one hundred particle sections, the total area of the third regions in the one hundred particles and the total area of the island phases included in the third regions are determined, the ratio of the total area of the island phases included in the third regions to the total area of the third regions is calculated, and the result is assumed to be the area ratio As3(%).

The total concentration of Al, Mg, and Ca contained in the pressure sensitive adhesive particle of the exemplary embodiment may satisfy the following requirement (3), more preferably satisfies the following requirement (3'), and yet more preferably satisfies the following requirement (3").

Requirement (3): When the volume-average particle diameter of the pressure sensitive adhesive particle is represented by D (μm), the total concentration Mes (%) of Al, Mg, and Ca as measured by energy-dispersive X-ray spectroscopy at an acceleration voltage of $0.6 \times D+0.9$ (kV) and the total concentration Met (%) of Al, Mg, and Ca as measured by energy-dispersive X-ray spectroscopy at an acceleration voltage of $1.8 \times D+4.9$ (kV) have a relationship of $0.15 \leq Mes/Met < 0.60$.

Requirement (3'): When the volume-average particle diameter of the pressure sensitive adhesive particle is represented by D (μm), the total concentration Mes (%) of Al, Mg, and Ca as measured by energy-dispersive X-ray spectroscopy at an acceleration voltage of $0.6 \times D+0.9$ (kV) and the total concentration Met (%) of Al, Mg, and Ca as measured by energy-dispersive X-ray spectroscopy at an acceleration voltage of $1.8 \times D+4.9$ (kV) have a relationship of $0.20 \leq Mes/Met < 0.60$.

Requirement (3"): When the volume-average particle diameter of the pressure sensitive adhesive particle is represented by D (μm), the total concentration Mes (%) of Al, Mg, and Ca as measured by energy-dispersive X-ray spectroscopy at an acceleration voltage of $0.6 \times D+0.9$ (kV) and the total concentration Met (%) of Al, Mg, and Ca as measured by energy-dispersive X-ray spectroscopy at an acceleration voltage of $1.8 \times D+4.9$ (kV) have a relationship of $0.25 \leq Mes/Met < 0.60$.

The concentration Mes is the total concentration of Al, Mg, and Ca as measured by energy-dispersive X-ray spectroscopy at a low acceleration voltage of $0.6 \times D+0.9$ (kV), and is the total concentration (mass basis) of Al, Mg, and Ca in the particle surface layer (for example, a region from the particle surface irradiated with the electron beam to a depth of $D \times 15\%$).

The concentration Met is the total concentration of Al, Mg, and Ca as measured by energy-dispersive X-ray spectroscopy at a high acceleration voltage of 1.8× D++4.9 (kV), and is the total concentration (mass basis) of Al, Mg, and Ca in the entirety of the particle (the entire region from the particle surface irradiated with the electron beam to a particle surface on the opposite side).

Satisfying the requirement (3), (3'), or (3") indicates that the Al, Mg, and Ca in the pressure sensitive adhesive particle are unevenly distributed in the particle surface layer.

Among Al, Mg, and Ca, Al, which can form trivalent ions, is a metal that can be easily ion-crosslinked; thus, the Al concentration in the pressure sensitive adhesive particle of the exemplary embodiment preferably satisfies the following requirement (4), more preferably satisfies the following requirement (4'), and yet more preferably satisfies the following requirement (4").

Requirement (4): When the volume-average particle diameter of the pressure sensitive adhesive particle is represented by D (μm), the Al concentration Als (%) as measured by energy-dispersive X-ray spectroscopy at an acceleration voltage of 0.6× D+0.9 (kV) and the Al concentration Alt (%) as measured by energy-dispersive X-ray spectroscopy at an acceleration voltage of 1.8× D+4.9 (kV) have a relationship of $0.15 \leq Als/Alt < 0.60$.

Requirement (4'): When the volume-average particle diameter of the pressure sensitive adhesive particle is represented by D (μm), the Al concentration Als (%) as measured by energy-dispersive X-ray spectroscopy at an acceleration voltage of 0.6× D+0.9 (kV) and the Al concentration Alt (%) as measured by energy-dispersive X-ray spectroscopy at an acceleration voltage of 1.8× D+4.9 (kV) have a relationship of $0.20 \leq Als/Alt < 0.60$.

Requirement (4"): When the volume-average particle diameter of the pressure sensitive adhesive particle is represented by D (μm), the Al concentration Als (%) as measured by energy-dispersive X-ray spectroscopy at an acceleration voltage of 0.6× D+0.9 (kV) and the Al concentration Alt (%) as measured by energy-dispersive X-ray spectroscopy at an acceleration voltage of 1.8× D+4.9 (kV) have a relationship of $0.25 \leq Als/Alt < 0.60$.

The concentration Als is the Al concentration as measured by energy-dispersive X-ray spectroscopy at a low acceleration voltage of 0.6× D+0.9 (kV), and is the Al concentration (mass basis) in the particle surface layer (for example, a region from the particle surface irradiated with the electron beam to a depth of D×15%).

The concentration Alt is the Al concentration as measured by energy-dispersive X-ray spectroscopy at a high acceleration voltage of 1.8× D+4.9 (kV), and is the Al concentration (mass basis) in the entirety of the particle (the entire region from the particle surface irradiated with the electron beam to a particle surface on the opposite side).

Satisfying the requirement (4), (4'), or (4") indicates that Al in the pressure sensitive adhesive particle is unevenly distributed in the particle surface layer.

The pressure sensitive adhesive particle may be made to satisfy the requirement (3) or (4) by, for example, the choice of the type of the aggregating agent and increasing or decreasing the amount of the aggregating agent added in the method for producing a pressure sensitive adhesive base particle described below.

The Al, Mg, and Ca concentrations are measured by the energy-dispersive X-ray spectroscopy as follows.

By using a tablet former, 120 mg of pressure sensitive adhesive particles are formed into a disk having a diameter of 13 mm, and this disk is used as a measurement sample.

By using a scanning electron microscope equipped with an energy-dispersive X-ray spectrometer (X-MAX produced by Horiba Ltd.), the acceleration voltage is set to 0.6× D+0.9 (kV) or 1.8×D+4.9 (kV), and the types and quantities of elements in the measurement sample within the range obtained at an observation factor of 1000 are analyzed.

When the pressure sensitive adhesive particle contains an external additive, the external additive is removed from the surface of the pressure sensitive adhesive particle, and then a measurement sample is prepared by using a tablet former. The external additive is removed from the surface of the pressure sensitive adhesive particle by repeating ultrasonic washing in water (at a water temperature of 20° C. and an amplitude of 180 μm for 30 minutes) and drying.

From the viewpoint of handling ease of the pressure sensitive adhesive particle, the volume-average particle diameter (D50 v) of the pressure sensitive adhesive particle is preferably 4 μm or more, more preferably 5 μm or more, and yet more preferably 6 μm or more, and from the viewpoint of facilitating the pressure-induced phase transition of the entire pressure sensitive adhesive particle, the volume-average particle diameter (D50 v) is preferably 12 μm or less, more preferably 10 μm or less, and yet more preferably 9 μm or less.

The volume-average particle diameter (D50 v) of the pressure sensitive adhesive particle is determined by using Coulter MULTISIZER II (produced by Beckman Coulter Inc.) with an aperture having a diameter of 100 μm. Into 2 mL of a 5 mass % aqueous sodium alkyl benzenesulfonate solution, 0.5 mg or more and 50 mg or less of the pressure sensitive adhesive particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume-average particle diameter (D50 v).

The components, structure, and properties of the pressure sensitive adhesive particle according to this exemplary embodiment will now be described in detail. In the description below, unless otherwise noted, a "styrene resin" refers to a "styrene resin that contains, as polymerization components, styrene and a vinyl monomer other than styrene", and a "(meth)acrylate resin" refers to a "(meth)acrylate resin that contains, as polymerization components, at least two (meth)acrylates that account for 90 mass % or more of all polymerization components".

The pressure sensitive adhesive particle of the exemplary embodiment contains at least a pressure sensitive adhesive base particle and, if needed, an external additive.

Pressure Sensitive Adhesive Base Particle

The pressure sensitive adhesive base particle contains at least a styrene resin and a (meth)acrylate resin. The pressure sensitive adhesive base particle may further contain a coloring agent, a releasing agent, and other additives.

From the viewpoint of maintaining adhesiveness, the pressure sensitive adhesive base particle may contain a larger amount of the styrene resin than the (meth)acrylate resin. The styrene resin content relative to the total content of the styrene resin and the (meth)acrylate resin is preferably 55 mass % or more and 80 mass % or less, is more preferably 60 mass % or more and 75 mass % or less, and is yet more preferably 65 mass % or more and 70 mass % or less.

Styrene Resin

The pressure sensitive adhesive base particle that constitutes the pressure sensitive adhesive particle of this exemplary embodiment contains a styrene resin that contains, as polymerization components, styrene and a vinyl monomer other than styrene.

From the viewpoint of suppressing fluidization of the pressure sensitive adhesive particle in an unpressured state, the mass ratio of styrene relative to the total of the polymerization components of the styrene resin is preferably 60 mass % or more, more preferably 70 mass % or more, and yet more preferably 75 mass % or more. From the viewpoint of forming a pressure sensitive adhesive particle that easily undergoes pressure-induced phase transition, the mass ratio is preferably 95 mass % or less, more preferably 90 mass % or less, and yet more preferably 85 mass % or less.

Examples of the vinyl monomer other than styrene constituting the styrene resin include styrene monomers other than styrene and acryl monomers.

Examples of the styrene monomers other than styrene include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene. These styrene monomers may be used alone or in combination.

The acryl monomer may be at least one acryl monomer selected from the group consisting of (meth)acrylic acid and (meth)acrylates. Examples of the (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates. These acryl monomers may be used alone or in combination.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxyethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

Examples of other vinyl monomer constituting the styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene.

From the viewpoint of forming a pressure sensitive adhesive particle that easily undergoes pressure-induced phase transition, the styrene resin preferably contains, as a polymerization component, a (meth)acrylate, more preferably an alkyl (meth)acrylate, yet more preferably an alkyl (meth) acrylate in which the alkyl group contains 2 to 10 carbon atoms, still more preferably an alkyl (meth)acrylate in which the alkyl group contains 4 to 8 carbon atoms, and particularly preferably at least one of n-butyl acrylate and 2-ethylhexyl acrylate. From the viewpoint of forming a pressure sensitive adhesive particle that easily undergoes pressure-induced phase transition, the styrene resin and the (meth) acrylate resin may contain the same (meth)acrylate as a polymerization component.

From the viewpoint of suppressing fluidization of the pressure sensitive adhesive particle in an unpressured state, the mass ratio of the (meth)acrylate relative to the total of the polymerization components of the styrene resin is preferably 40 mass % or less, more preferably 30 mass % or less, and yet more preferably 25 mass % or less. From the viewpoint of forming a pressure sensitive adhesive particle that easily undergoes pressure-induced phase transition, the mass ratio is preferably 5 mass % or more, more preferably 10 mass % or more, and yet more preferably 15 mass % or more. The (meth)acrylate here is preferably an alkyl (meth)acrylate, yet more preferably an alkyl (meth)acrylate in which the alkyl group contains 2 to 10 carbon atoms, and still more preferably an alkyl (meth)acrylate in which the alkyl group contains 4 to 8 carbon atoms.

The styrene resin particularly preferably contains, as a polymerization component, at least one of n-butyl acrylate and 2-ethylhexyl acrylate, and the total amount of n-butyl acrylate and 2-ethylhexyl acrylate relative to the total of polymerization components of the styrene resin is preferably 40 mass % or less, more preferably 30 mass % or less, and yet more preferably 25 mass % or less from the viewpoint of suppressing fluidization of the pressure sensitive adhesive particle in an unpressured state. From the viewpoint of forming a pressure sensitive adhesive particle that easily undergoes pressure-induced phase transition, the total amount is preferably 5 mass % or more, more preferably 10 mass % or more, and yet more preferably 15 mass % or more.

From the viewpoint of suppressing fluidization of the pressure sensitive adhesive particle in an unpressured state, the weight-average molecular weight of the styrene resin is preferably 3000 or more, more preferably 4000 or more, and yet more preferably 5000 or more. From the viewpoint of forming a pressure sensitive adhesive particle that easily undergoes pressure-induced phase transition, the weight-average molecular weight is preferably 60000 or less, more preferably 55000 or less, and yet more preferably 50000 or less.

In the present disclosure, the weight-average molecular weight of a resin is measured by gel permeation chromatography (GPC). The molecular weight measurement by GPC is conducted by using HLC-8120GPC produced by TOSOH CORPORATION as a GPC instrument with columns, TSKgel Super HM-M (15 cm) produced by TOSOH CORPORATION, and tetrahydrofuran as a solvent. The weight-average molecular weight of a resin is calculated by using a molecular weight calibration curve prepared by using monodisperse polystyrene standard samples.

From the viewpoint of suppressing fluidization of the pressure sensitive adhesive particle in an unpressured state, the glass transition temperature of the styrene resin is preferably 30° C. or more, more preferably 40° C. or more, and yet more preferably 50° C. or more. From the viewpoint of forming a pressure sensitive adhesive particle that easily undergoes pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin can be controlled by the types of polymerizable components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the pressure sensitive adhesive particle in an unpressured state, the mass ratio of the styrene resin relative to the entire pressure sensitive adhesive base particle in this exemplary embodiment is preferably 55 mass % or more, more preferably 60 mass % or more, and yet more preferably 65 mass % or more. From the viewpoint of forming a pressure sensitive adhesive particle that easily undergoes pressure-induced phase transition, the mass ratio is preferably 80 mass % or less, more preferably 75 mass % or less, and yet more preferably 70 mass % or less.

(Meth)Acrylate Resin

The pressure sensitive adhesive base particle constituting the pressure sensitive adhesive particle of this exemplary embodiment contains a (meth)acrylate resin that contains, as polymerization components, at least two (meth)acrylates that account for 90 mass % or more of all polymerization components.

The (meth)acrylates preferably account for 90 mass % or more, preferably 95 mass % or more, more preferably 98 mass % or more, and yet more preferably 100 mass % of all polymerization components of the methacrylate resin.

Examples of the (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

These (meth)acrylates may be used alone or in combination.

From the viewpoint of forming a pressure sensitive adhesive particle that easily undergoes pressure-induced phase transition and has excellent adhesiveness, the (meth)acrylates are preferably alkyl (meth)acrylates, yet more preferably alkyl (meth)acrylates in which the alkyl group contains 2 to 10 carbon atoms, still more preferably alkyl (meth)acrylates in which the alkyl group contains 4 to 8 carbon atoms, and particularly preferably n-butyl acrylate and 2-ethylhexyl acrylate. From the viewpoint of forming a pressure sensitive adhesive particle that easily undergoes pressure-induced phase transition, the styrene resin and the (meth)acrylate resin may contain the same (meth)acrylate as a polymerization component.

From the viewpoint of forming a pressure sensitive adhesive particle that easily undergoes pressure-induced phase transition and has excellent adhesiveness, the alkyl (meth)acrylates preferably account for 90 mass % or more, more preferably 95 mass % or more, yet more preferably 98 mass % or more, and still more preferably 100 mass % of all polymerization components of the (meth)acrylate resin. The alkyl (meth)acrylates here preferably each have an alkyl group having 2 to 10 carbon atoms and more preferably each have an alkyl group containing 4 to 8 carbon atoms.

From the viewpoint of forming a pressure sensitive adhesive particle that easily undergoes pressure-induced phase transition and has excellent adhesiveness, the mass ratio between two (meth)acrylates having the largest and second-largest mass ratios among the at least two (meth)acrylates contained as the polymerization components in the (meth)acrylate resin is preferably 80:20 to 20:80, more preferably 70:30 to 30:70, and yet more preferably 60:40 to 40:60.

The two (meth)acrylates having the largest and second-largest mass ratios among the at least two (meth)acrylates contained as the polymerization components in the (meth)acrylate resin are preferably alkyl (meth)acrylates. The alkyl (meth)acrylates here preferably each have an alkyl group having 2 to 10 carbon atoms and more preferably each have an alkyl group containing 4 to 8 carbon atoms.

When the two (meth)acrylates having the largest and second-largest mass ratios among the at least two (meth)acrylates contained as polymerization components in the (meth)acrylate resin are alkyl (meth)acrylates, from the viewpoint of forming a pressure sensitive adhesive particle that easily undergoes pressure-induced phase transition and has excellent adhesiveness, the difference in the number of carbon atoms in the alkyl group between the two alkyl (meth)acrylates is preferably 1 to 4, more preferably 2 to 4, and yet more preferably 3 or 4.

From the viewpoint of forming a pressure sensitive adhesive particle that easily undergoes pressure-induced phase transition and has excellent adhesiveness, the (meth)acrylate resin preferably contains, as polymerization components, n-butyl acrylate and 2-ethylhexyl acrylate. In particular, the two (meth)acrylates having the largest and second-largest mass ratios among the at least two (meth)acrylates contained as polymerization components in the (meth)acrylate resin are preferably n-butyl acrylate and 2-ethylhexyl acrylate. The total amount of n-butyl acrylate and 2-ethylhexyl acrylate relative to all polymerization components of the (meth)acrylate resin is preferably 90 mass % or more, more preferably 95 mass % or more, yet more preferably 98 mass % or more, and still more preferably 100 mass %.

The (meth)acrylate resin may further contain, as polymerizable components, vinyl monomers other than (meth)acrylates. Examples of the vinyl monomers other than the (meth)acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefines such as isoprene, butene, and butadiene. These vinyl monomers may be used alone or in combination.

When the (meth)acrylate resin contains a vinyl monomer other than (meth)acrylates as polymerization components, the vinyl monomer other than the (meth)acrylates is preferably at least one of acrylic acid and methacrylic acid and is more preferably acrylic acid.

From the viewpoint of suppressing fluidization of the pressure sensitive adhesive particle in an unpressured state, the weight-average molecular weight of the (meth)acrylate resin is preferably 50,000 or more, more preferably 100,000 or more, yet more preferably 120,000 or more, and still more preferably 150,000 or more. From the viewpoint of forming a pressure sensitive adhesive particle that easily undergoes pressure-induced phase transition, the weight-average molecular weight is preferably 250,000 or less, more preferably 220,000 or less, and yet more preferably 200,000 or less.

From the viewpoint of forming a pressure sensitive adhesive particle that easily undergoes pressure-induced phase transition, the glass transition temperature of the (meth)acrylate resin is preferably 10° C. or less, more preferably 0° C. or less, and yet more preferably −10° C. or less. From the viewpoint of suppressing fluidization of the pressure sensitive adhesive particle in an unpressured state, the glass transition temperature is preferably −90° C. or more, more preferably −80° C. or more, and yet more preferably −70° C. or more.

In this exemplary embodiment, from the viewpoint of forming a pressure sensitive adhesive particle that easily undergoes pressure-induced phase transition, the mass ratio of the (meth)acrylate resin relative to the entire pressure sensitive adhesive base particle is preferably 20 mass % or more, more preferably 25 mass % or more, and yet more preferably 30 mass % or more. From the viewpoint of suppressing fluidization of the pressure sensitive adhesive particle in an unpressured state, the mass ratio is preferably 45 mass % or less, more preferably 40 mass % or less, and yet more preferably 35 mass % or less.

In this exemplary embodiment, the total amount of the styrene resin and the (meth)acrylate resin contained in the pressure sensitive adhesive base particle relative to the entire pressure sensitive adhesive base particle is preferably 70 mass % or more, more preferably 80 mass % or more, yet more preferably 90 mass % or more, still preferably 95 mass % or more, and most preferably 100 mass %.

Other resins The pressure sensitive adhesive base particle may contain, for example, polystyrene, and a non-vinyl resin such as an epoxy resin, a polyester resin, a polyurethane resin, a polyamide resin, a cellulose resin, a polyether resin, or modified rosin. These resins may be used alone or in combination.

Various Additives

The pressure sensitive adhesive base particle may contain, if needed, a coloring agent (for example, a pigment or a dye), a releasing agent (for example, hydrocarbon wax, natural wax such as carnauba wax, rice wax, or candelilla wax, a synthetic or mineral or petroleum wax such as montan wax; or ester wax such as fatty acid ester or montanic acid ester), a charge controlling agent, and the like.

When the pressure sensitive adhesive particle of this exemplary embodiment is transparent, the amount of the coloring agent in the pressure sensitive adhesive base particle relative to the entire pressure sensitive base particle may be 1.0 mass % or less, and, from the viewpoint of increasing the transparency of the pressure sensitive adhesive particle, is preferably as small as possible.

Structure of Pressure Sensitive Adhesive Base Particle

The inner structure of the pressure sensitive adhesive base particle is a sea-island structure. The sea-island structure has a sea phase that contains the styrene resin, and island phases that are dispersed in the sea phase and contain the (meth)acrylate resin. Specific examples of the styrene resin contained in the sea phase are as described above. Specific examples of the (meth)acrylate resin contained in the island phases are as described above. Alternatively, island phases not containing a (meth)acrylate resin may be dispersed in the sea phase.

In the sea-island structure of the pressure sensitive adhesive base particle, the average diameter of the island phases may be 200 nm or more and 500 nm or less. When the average diameter of the island phases is 500 nm or less, the pressure sensitive adhesive base particle easily undergoes pressure-induced phase transition. When the average diameter of the island phases is 200 nm or more, excellent mechanical strength suitable for the pressure sensitive adhesive base particle (for example, the strength that withstands deformation during stirring in a developing device) is exhibited. From these viewpoints, the average diameter of the island phases is more preferably 220 nm or more and 450 nm or less and yet more preferably 250 nm or more and 400 nm or less.

Examples of the method for controlling the average diameter of the island phases in the sea-island structure to be within the aforementioned range include increasing or decreasing the amount of the (meth)acrylate resin relative to the amount of the styrene resin and increasing or decreasing the length of time of maintaining a high temperature in the step of fusing and coalescing aggregated particles in the method for producing pressure sensitive adhesive base particles described below.

The pressure sensitive adhesive base particle may have a single layer structure or may have a core-shell structure including a core and a shell layer that covers the core. From the viewpoint of suppressing fluidization of the pressure sensitive adhesive particle in an unpressured state, the pressure sensitive adhesive base particle may have a core-shell structure.

From the viewpoint of facilitating the pressure-induced phase transition, when the pressure sensitive adhesive base particle has a core-shell structure, the core may contain a styrene resin and a (meth)acrylate resin. From the viewpoint of suppressing fluidization of the pressure sensitive adhesive particle in an unpressured state, the shell layer may contain a styrene resin. The specific examples of the styrene resin are as described above. The specific examples of the (meth) acrylate resin are as described above.

When the pressure sensitive adhesive base particle has a core-shell structure, the core may have a sea phase that contains a styrene resin, and island phases that are dispersed in the sea phase and contain a (meth)acrylate resin. The average diameter of the island phases may be within the aforementioned range. In addition to the core having the above-described structure, the shell layer may contain a styrene resin. In such a case, the sea phase of the core and the shell layer form a continuous structure, and the pressure sensitive adhesive base particle easily undergoes pressure-induced phase transition. The specific examples of the styrene resin contained in the sea phase of the core and the shell layer are as described above. The specific examples of the (meth)acrylate resin contained in the island phases of the core are as described above.

Examples of the resin contained in the shell layer also include polystyrene, and non-vinyl resins such as epoxy resins, polyester resins, polyurethane resins, polyamide resins, cellulose resins polyether resins, and modified rosin. These resins may be used alone or in combination.

From the viewpoint of suppressing deformation of the pressure sensitive adhesive base particle, the average thickness of the shell layer is preferably 120 nm or more, more preferably 130 nm or more, and yet more preferably 140 nm or more. From the viewpoint of facilitating the pressure-induced phase transition of the pressure sensitive adhesive base particle, the average thickness is preferably 550 nm or less, more preferably 500 nm or less, and yet more preferably 400 nm or less.

The average thickness of the shell layer is measured by the following method.

The pressure sensitive adhesive particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, sections of ten pressure sensitive adhesive base particles are selected at random, the thickness of the shell layer is measured at twenty positions for each of the pressure sensitive adhesive base particles, and the average thickness is calculated. The average value of ten pressure sensitive adhesive base particles is used as the average thickness.

From the viewpoint of handling ease of the pressure sensitive adhesive base particle, the volume-average particle diameter (D50 v) of the pressure sensitive adhesive base particle is preferably 4 µm or more, more preferably 5 µm or more, and yet more preferably 6 µm or more, and from the viewpoint of facilitating the pressure-induced phase transition of the entire pressure sensitive adhesive base particle, the volume-average particle diameter (D50 v) is preferably 12 µm or less, more preferably 10 µm or less, and yet more preferably 9 µm or less.

The volume-average particle diameter (D50 v) of the pressure sensitive adhesive base particle is determined by using Coulter MULTISIZER II (produced by Beckman Coulter Inc.) with an aperture having a diameter of 100 µm. Into 2 mL of a 5 mass % aqueous sodium alkyl benzenesulfonate solution, 0.5 mg or more and 50 mg or less of the pressure sensitive adhesive base particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 µm or more and 60 µm or less in the sample are measured. The particle diameter at 50% accumulation in a volume-based particle size distribution calculated from the small diameter side is used as the volume-average particle diameter (D50 v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)$ n, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine high-molecular-weight materials).

The externally added amount of the external additive relative to the pressure sensitive adhesive base particle is preferably 0.01 mass % or more and 5 mass % or less and is more preferably 0.01 mass % or more and 2.0 mass % or less.

Properties of Pressure Sensitive Adhesive Particle

The pressure sensitive adhesive particle of the exemplary embodiment has at least two glass transition temperatures, one of which is presumed to be that of the styrene resin and the other one of which is presumed to be that of the (meth)acrylate resin.

The pressure sensitive adhesive particle of the exemplary embodiment may have three or more glass transition temperatures; however, the number of glass transition temperatures is preferably two. Examples of the case in which there are two glass transition temperatures include the case in which a styrene resin and a (meth)acrylate resin are the only resins contained in the pressure sensitive adhesive particle, and the case in which the amount of resins other than the styrene resin and the (meth)acrylate resin is small (for example, the amount of other resins is 5 mass % or less relative to the entire pressure sensitive adhesive particle).

The pressure sensitive adhesive particle of this exemplary embodiment has at least two glass transition temperatures, and the difference between the lowest glass transition temperature and the highest glass transition temperature is 30° C. or more. From the viewpoint of facilitating the pressure-induced phase transition of the pressure sensitive adhesive particle, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of facilitating the pressure-induced phase transition of the pressure sensitive adhesive particle, the lowest glass transition temperature of the pressure sensitive adhesive particle of this exemplary embodiment is preferably 10° C. or less, more preferably 0° C. or less, and yet more preferably −10° C. or less. From the viewpoint of suppressing fluidization of the pressure sensitive adhesive particle in an unpressured state, the lowest glass transition temperature is preferably −90° C. or more, more preferably −80° C. or more, and yet more preferably −70° C. or more.

From the viewpoint of suppressing fluidization of the pressure sensitive adhesive particle in an unpressured state, the highest glass transition temperature of the pressure sensitive adhesive particle of this exemplary embodiment is preferably 30° C. or more, more preferably 40° C. or more, and yet more preferably 50° C. or more. From the viewpoint of facilitating the pressure-induced phase transition of the pressure sensitive adhesive particle, the highest glass transition temperature is preferably 70° C. or less, more preferably 65° C. or less, and yet more preferably 60° C. or less.

In the present disclosure, the glass transition temperature of the pressure sensitive adhesive particle is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The pressure sensitive adhesive particle of the exemplary embodiment undergoes pressure-induced phase transition, and satisfies formula 1 below:

$$10° C. \leq T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa.

From the viewpoint of facilitating the pressure-induced phase transition of the pressure sensitive adhesive particle, the temperature difference (T1−T2) is preferably 10° C. or more, more preferably 15° C. or more, and yet more preferably 20° C. or more. From the viewpoint of suppressing fluidization of the pressure sensitive adhesive particle in an unpressured state, the temperature difference (T1−T2) is preferably 120° C. or less, more preferably 100° C. or less, and yet more preferably 80° C. or less.

The value of the temperature T1 is preferably 140° C. or less, more preferably 130° C. or less, yet more preferably 120° C. or less, and still more preferably 115° C. or less. The lower limit of the temperature T1 is preferably 80° C. or more and more preferably 85° C. or more.

The value of the temperature T2 is preferably 40° C. or more, more preferably 50° C. or more, and yet more preferably 60° C. or more. The upper limit of the temperature T2 may be 85° C. or less.

One indicator of how easily the pressure sensitive adhesive particle undergoes pressure-induced phase transition is the temperature difference (T1−T3) between the temperature T1 at which the viscosity is 10000 Pa·s at a pressure of 1 MPa and the temperature T3 at which the viscosity is 10000 Pa·s at a pressure of 4 MPa. The temperature difference (T1−T3) may be 5° C. or more. From the viewpoint of facilitating the pressure-induced phase transition, the temperature difference (T1−T3) of the pressure sensitive adhesive particle is preferably 5° C. or more and more preferably 10° C. or more.

The temperature difference (T1−T3) is typically 25° C. or less.

From the viewpoint of adjusting the temperature difference (T1−T3) to 5° C. or more, the temperature T3 of the pressure sensitive adhesive particle of the exemplary embodiment at which the viscosity is 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Pressure sensitive adhesive particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined by the same method for determining the temperature T1 except that the applied pressure is changed from 1 MPa to 10 MPa. The temperature T3 is determined by the same method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Method for producing pressure sensitive adhesive particle

The pressure sensitive adhesive particle of the exemplary embodiment is obtained by first producing a pressure sensitive adhesive base particle and then externally adding an external additive to the pressure sensitive adhesive base particle.

The pressure sensitive adhesive base particle may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce the pressure sensitive adhesive base particle.

When the pressure sensitive adhesive base particle is to be produced by the aggregation and coalescence method, the pressure sensitive adhesive base particle is produced through, for example, the following steps:

a step of preparing a styrene resin particle dispersion in which styrene resin particles containing a styrene resin are dispersed (styrene resin particle dispersion preparation step);

a step of polymerizing a (meth)acrylate resin in the styrene resin particle dispersion so as to form composite resin particles containing the styrene resin and the (meth)acrylate resin (composite resin particle forming step);

a step aggregating the composite resin particles in the composite resin particle dispersion in which the composite resin particles are dispersed so as to form aggregated particles (aggregated particle forming step); and a step of heating the aggregated particle dispersion in which the aggregated particles are dispersed so as to fuse and coalesce the aggregated particles and thereby form pressure sensitive adhesive base particles (fusing and coalescing step).

These steps will now be described in detail.

In the description below, a method for obtaining a pressure sensitive adhesive base particle not containing a coloring agent or a releasing agent is described. A coloring agent, a releasing agent, and other additives may be used as needed. When the pressure sensitive adhesive base particle is to contain a coloring agent and a releasing agent, the fusing and coalescing step is performed after the composite resin particle dispersion, a coloring agent particle dispersion, and a releasing agent particle dispersion are mixed. The coloring agent particle dispersion and the releasing agent particle dispersion can be, for example, prepared by mixing raw materials and then dispersing the particles in a known disperser machine.

Styrene Resin Particle Dispersion Preparation Step

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a styrene resin, and a chain transfer agent or a polymerization initiator are mixed, an aqueous medium containing a surfactant is added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50 v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-base particle size distribution calculated from the small diameter side.

The styrene resin particle content in the styrene resin particle dispersion is preferably 30 mass % or more and 60 mass % or less and is more preferably 40 mass % or more and 50 mass % or less.

Composite Resin Particle Forming Step

The styrene resin particle dispersion and the polymerization components of a (meth)acrylate resin are mixed, and the (meth)acrylate resin is polymerized in the styrene resin particle dispersion so as to form composite resin particles containing the styrene resin and the (meth)acrylate resin.

The composite resin particles may be resin particles containing a styrene resin and a (meth)acrylate resin that are in a microphase-separated state. Such resin particles can be produced by, for example, the following method.

To a styrene resin particle dispersion, polymerization components (a group of monomers including at least two (meth)acrylates) of the (meth)acrylate resin are added, and, if needed, an aqueous medium is added thereto. Next, while slowly stirring the dispersion, the temperature of the dispersion is elevated to a temperature higher than or equal to the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the (meth)acrylates become polymerized inside the styrene resin particles. It is presumed that because of this mechanism, composite resin particles in which the (meth)acrylate resin is contained inside the styrene resin particles and in which the styrene resin and the (meth)acrylate resin are in a microphase-separated state inside the particles are obtained.

During or after production of the composite resin particles described above, polymerization components (in other words, styrene and a vinyl monomer other than styrene) of the styrene resin may be added to the dispersion containing the dispersed composite resin particles, and the polymerization reaction may be continued. Presumably as a result, composite resin particles in which the styrene resin and the (meth)acrylate resin form a microphase-separated state inside the particles and in which the styrene resin is attached to the particle surfaces are obtained. A pressure sensitive adhesive particle produced by using a composite resin particle having a styrene resin attached to a particle surface thereof generates relatively fewer coarse particles.

The vinyl monomer, which is a polymerization component of the styrene resin to be attached to the surface of the composite resin particle, may contain the same monomer as at least one of the monomers constituting the styrene resin or the (meth)acrylate resin inside the composite resin particle, and, specifically, may contain at least one of n-butyl acrylate and 2-ethylhexyl acrylate.

The volume-average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less.

Aggregated Particle Forming Step

The composite resin particles are aggregated in the composite resin particle dispersion so as to form aggregated particles having diameters close to the target diameter of the pressure sensitive adhesive base particle.

Specifically, for example, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the styrene resin (specifically, for example, a temperature 10° C. to 30° C. lower than the glass transition temperature of the styrene resin) so as to aggregate the composite resin particles and form aggregated particles.

In the aggregated particle forming step, heating may be performed after an aggregating agent is added to the composite resin particle dispersion being stirred in a rotational shear-type homogenizer at room temperature (for example, 25° C.), the pH of the composite resin particle dispersion is adjusted to acidic (for example, a pH2 or more and 5 or less), and a dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

Next, the aggregated particle dispersion containing dispersed aggregated particles is heated to, for example, a temperature equal to or higher than the glass transition temperature of the styrene resin (for example, a temperature 10° C. to 30° C. higher than the glass transition temperature of the styrene resin) to fuse and coalesce the aggregated particles and form pressure sensitive adhesive base particles.

The pressure sensitive adhesive base particle obtained through the above-described steps usually has a sea-island structure that has a sea phase containing a styrene resin and island phases containing a (meth)acrylate resin and being dispersed in the sea phase. It is presumed that although the styrene resin and the (meth)acrylate resin are in a microphase-separated state in the composite resin particles, the styrene resin has gathered to form a sea phase, and the (meth)acrylate resin has gathered to form island phases in the fusing and coalescence step.

The average diameter of the island phases of the sea-island structure can be controlled by, for example, increasing or decreasing the amount of the styrene resin particle dispersion or the amount of the at least two (meth)acrylates used in the composite resin particle forming step, or by increasing or decreasing the length of time of maintaining a high temperature in the fusing and coalescing step.

The pressure sensitive adhesive base particles having a core-shell structure are produced through the following steps, for example:

after an aggregated particle dispersion is obtained, a step of mixing the aggregated particle dispersion and a styrene resin particle dispersion so that the styrene resin particles further attach to the surfaces of the aggregated particles and form second aggregated particles; and a step of heating the second aggregated particle dispersion in which the second aggregated particles are dispersed so as to fuse and coalesce the second aggregated particles and thereby form pressure sensitive adhesive base particles having a core-shell structure.

The pressure sensitive adhesive base particle having a core-shell structure obtained through the aforementioned steps has a shell layer containing a styrene resin. Instead of the styrene resin particle dispersion, a resin particle dispersion in which a different type of resin particles are dispersed may be used to form a shell layer that contains the different type of resin.

After completion of the fusing and coalescing step, the pressure sensitive adhesive base particles formed in the solution are subjected to a washing step, a solid-liquid separation step, and a drying step known in the art so as to obtain dry pressure sensitive adhesive base particles. From the viewpoint of chargeability, the washing step may involve thorough displacement washing with ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The pressure sensitive adhesive particle of this exemplary embodiment is formed by, for example, adding an external additive to the obtained dry pressure sensitive adhesive base particle, and mixing the resulting mixture. Mixing may be performed by using a V blender, a HENSCHEL mixer, a Lodige mixer, or the like. Furthermore, if needed, a vibrating screen, an air screen, or the like may be used to remove coarse particles of the pressure sensitive adhesive particle.

Cartridge

A cartridge according to an exemplary embodiment stores the pressure sensitive adhesive particle of the exemplary embodiment and is detachably attachable to a printed material producing apparatus. When the cartridge is attached to a printed material producing apparatus, the cartridge connects, via a supply pipe, to an applying unit that constitutes a part of the printed material producing apparatus and that applies the pressure sensitive adhesive particle to a recording medium.

When the pressure sensitive adhesive particle is supplied from the cartridge to the applying unit and the pressure sensitive adhesive particle level in the cartridge has run low, the cartridge is replaced.

Apparatus and Method for Producing Printed Material, and Printed Material

An apparatus for producing a printed material according to an exemplary embodiment includes an applying unit that stores the pressure sensitive adhesive particle of the exemplary embodiment and applies the pressure sensitive adhesive particle to a recording medium; and a pressure bonding unit that folds and pressure-bonds the recording medium or pressure-bonds the recording medium and another recording medium placed on top of each other.

The applying unit is equipped with, for example, a placing device that places the pressure sensitive adhesive particle on a recording medium, and a fixing device that fixes the pressure sensitive adhesive particle placed on the recording medium onto the recording medium.

For example, the pressure bonding unit is equipped with: a folding device that folds a recording medium having the pressure sensitive adhesive particle applied thereto or a stacking device that stacks another recording medium on top of the recording medium having the pressure sensitive adhesive particle applied thereto; and a pressurizing device that pressurizes the folded recording medium or the recording media stacked on top of each other.

The pressurizing device in the pressure bonding unit applies a pressure to a recording medium having pressure sensitive adhesive particle applied thereto. In this manner, the pressure sensitive adhesive particle is fluidized and exhibits adhesiveness on the recording medium.

A method for producing a printed material of this exemplary embodiment is performed by using the apparatus for producing a printed material of this exemplary embodiment. The method for producing a printed material according to the exemplary embodiment includes an applying step of using the pressure sensitive adhesive particle of the exemplary embodiment and applying the pressure sensitive adhesive particle to a recording medium; and a pressure bonding step of folding the recording medium and pressure-bonding the folded recording medium, or pressure-bonding the recording medium with another recording medium stacked on top thereof.

The applying step includes, for example, a step of placing a pressure sensitive adhesive particle onto a recording medium, and may further include a step of fixing the pressure sensitive adhesive particle placed on the recording medium onto the recording medium.

The pressure bonding step includes, for example, a folding step of folding the recording medium or a stacking step of stacking another recording medium on the recording medium; and a pressurizing step of pressurizing the folded recording medium or the stacked recording media.

The pressure sensitive adhesive particle may be applied to the entire surface of the recording medium or one part of the recording medium. One layer or two or more layers of the pressure sensitive adhesive particle are applied to the recording medium. The layer of the pressure sensitive adhesive particle may be a layer continuous in the surface direction of the recording medium or a layer discontinuous in the surface direction of the recording medium. The layer of the pressure sensitive adhesive particle may be a layer in which the pressure sensitive adhesive particles are aligned as particles or a layer in which adjacent pressure sensitive adhesive particles are fused and aligned with each other.

The amount of the pressure sensitive adhesive particles (preferably, transparent pressure sensitive adhesive particles) on the recording medium and applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles (preferably, transparent pressure sensitive adhesive particles) on the recording medium is, for example, 0.2 μm or more and 25 μm or less, 0.4 μm or more and 20 μm or less, or 0.6 μm or more and 15 μm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces.

Although some examples of the apparatus for producing a printed material according to the exemplary embodiment are described below, the exemplary embodiments are not limited to these.

FIG. 1 is a schematic diagram of an example of an apparatus for producing a printed material according to this exemplary embodiment. The apparatus for producing a printed material illustrated in FIG. 1 is equipped with an applying unit 100 and a pressure bonding unit 200 downstream of the applying unit 100. The arrow indicates the direction in which the recording medium is conveyed.

The applying unit 100 is a device that applies the pressure sensitive adhesive particles of the exemplary embodiment to a recording medium P. The recording medium P has an image formed on one or both surfaces in advance.

The applying unit 100 is equipped with a placing device 110 and a fixing device 120 disposed downstream of the placing device 110.

The placing device 110 places pressure sensitive adhesive particles M onto a recording medium P. Examples of the placing method employed by the placing device 110 include a spraying method, a bar coating method, a die coating method, a knife coating method, a roll coating method, a reverse roll coating method, a gravure coating method, a screen printing method, an ink jet method, a lamination method, and an electrophotographic method. Depending on the placing method, the pressure sensitive adhesive particles M may be dispersed in a dispersion medium to prepare a liquid composition, and this liquid composition may be used by the placing device 110.

The recording medium P having the pressure sensitive adhesive particles M placed thereon by the placing device 110 is conveyed to the fixing device 120.

Examples of the fixing device 120 include a heating device that has a heating source and heats the pressure sensitive adhesive particles M on the recording medium P passing therethrough to fix the pressure sensitive adhesive particles M onto the recording medium P; a pressurizing device that has a pair of pressurizing members (roll/roll or belt/roll) and pressurizes the recording medium P passing therethrough to fix the pressure sensitive adhesive particles M onto the recording medium P; and a pressurizing and heating device that has a pair of pressurizing members (roll/roll or belt/roll) equipped with heating sources inside and pressurizes and heats the recording medium P passing therethrough to fix the pressure sensitive adhesive particles M onto the recording medium P.

When the fixing device 120 has a heating source, the surface temperature of the recording medium P heated by the fixing device 120 is preferably 10° C. or more and 80° C. or less, more preferably 20° C. or more and 60° C. or less, and yet more preferably 30° C. or more and 50° C. or less.

When the fixing device 120 has a pressurizing member, the pressure applied to the recording medium P from the pressurizing member may be lower than the pressure applied to the recording medium P2 from the pressurizing device 230.

The recording medium P that has passed the applying unit 100 turns into a recording medium P1 having pressure sensitive adhesive particles M applied on the image. The recording medium P1 is conveyed toward the pressure bonding unit 200.

In the apparatus for producing a printed material according to this exemplary embodiment, the applying unit 100 and the pressure bonding unit 200 may be close to each other or distant from each other. When the applying unit 100 and the pressure bonding unit 200 are distant from each other, the applying unit 100 and the pressure bonding unit 200 are, for example, linked via a conveying unit (for example, a belt conveyor) that conveys the recording medium P1.

The pressure bonding unit 200 is equipped with a folding device 220 and a pressurizing device 230, and folds and pressure-bonds the recording medium P1.

The folding device 220 folds the recording medium P1 passing therethrough to prepare a folded recording medium P2. The recording medium P2 may be folded in two, in three, or in four, and may be folded only partly. The pressure sensitive adhesive particles M are applied to at least part of at least one of the opposing surface of the recording medium P2.

The folding device 220 may have a pair of pressurizing members (for example, roll/roll or belt/roll) that apply a pressure to the recording medium P2. The pressure which the pressurizing members of the folding device 220 apply to the recording medium P2 may be lower than the pressure which the pressurizing device 230 applies to the recording medium P2.

The pressure bonding unit 200 may be equipped with a stacking device that stacks another recording medium on top of the recording medium P1 instead of the folding device 220. Examples of the way in which the recording medium P1 and the additional recording medium are stacked on top of each other include stacking one recording medium on the recording medium P1, and stacking one recording medium on each of multiple regions in the recording medium P1. This additional recording medium may have an image formed on one or both surfaces in advance, may be free of any image, or may be a pressure-bonded printed material prepared in advance.

The recording medium P2 exits the folding device 220 (or stacking device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls, and may be a combination of a pressurizing roll and a pressurizing belt or a combination of a pressurizing belt and a pressurizing belt.

When a pressure is applied to the recording medium P2 passing the pressurizing device 230, the pressure sensitive adhesive particles M on the recording medium P2 are fluidized under pressure and exhibit adhesiveness.

The pressurizing device 230 may have a heating source (for example, a halogen heater) inside for heating the recording medium P2, but this is optional. The pressurizing device 230 may have no heating source inside, and this does not exclude that the temperature inside the pressurizing device 230 increases to a temperature equal to or more than the environment temperature due to heat from a motor in the pressurizing device 230 or the like.

As the recording medium P2 passes the pressurizing device 230, the opposing folded surfaces bond with each other with the fluidized pressure sensitive adhesive particles M, and a pressure-bonded printed material P3 is obtained. Two opposing surfaces of the pressure-bonded printed material P3 are bonded to each other partly or entirely.

The finished pressure-bonded printed material P3 is discharged from the pressurizing device 230.

A first form of the pressure-bonded printed material P3 is formed of a folded recording medium having opposing surfaces bonded with the pressure sensitive adhesive particles M. The pressure-bonded printed material P3 of this form is produced by the apparatus for producing a printed material equipped with a folding device 220.

A second form of the pressure-bonded printed material P3 is formed of multiple recording media stacked on top of each other and having opposing surfaces bonded with the pressure sensitive adhesive particles M. The pressure-bonded printed material P3 of this form is produced by the pressure-bonded printed material producing apparatus equipped with a stacking device.

The apparatus for producing a printed material according to this exemplary embodiment is not limited to a type that continuously conveys the recording medium P2 from the folding device 220 (or stacking device) to the pressurizing device 230. The apparatus for producing a printed material according to this exemplary embodiment may be of a type that stocks the recording media P2 discharged from the folding device 220 (or stacking device) and conveys the recording media P2 to the pressurizing device 230 after a predetermined amount of the recording media P2 are stored.

In the apparatus for producing a printed material according to this exemplary embodiment, the folding device 220 (or stacking device) and the pressurizing device 230 may be close to each other or distant from each other. When the folding device 220 (or stacking device) and the pressurizing device 230 are distant from each other, the folding device 220 (or stacking device) and the pressurizing device 230 are, for example, linked via a conveying unit (for example, a belt conveyor) that conveys the recording medium P2.

The apparatus for producing a printed material according to this exemplary embodiment may be equipped with a cutting unit that cuts the recording medium into a predetermined size. Examples of the cutting unit include a cutting unit that is disposed between the applying unit 100 and the pressure bonding unit 200 and cuts off a part of the recording medium P1, the part being a region where no pressure sensitive adhesive particles M are applied; a cutting unit that is disposed between the folding device 220 and the pressurizing device 230 and cuts off a part of the recording medium P2, the part being a region where no pressure sensitive adhesive particles M are applied; and a cutting unit that is disposed downstream of the pressure bonding unit 200 and cuts off a part of the pressure-bonded printed material P3, the part being a region not bonded with the pressure sensitive adhesive particles M.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size.

The apparatus for producing a printed material (image forming apparatus) according to this exemplary embodiment may further include a color image forming unit that forms a color image on a recording medium by using a coloring material. Examples of the color image forming unit include a unit that forms a color ink image on a recording medium by an inkjet method using a color ink as a coloring material, and a unit that electrophotographically forms a color image on a recording medium by using a color electrostatic charge image developer.

The above-described production apparatus is used to implement the method for producing a printed material of the exemplary embodiment, the method further including a color image forming step of forming a color image on the recording medium by using a coloring material. Examples of the color image forming step include a step of forming a color ink image on a recording medium by an inkjet method using a color ink as a coloring material, and a step of electrophotographically forming a color image on a recording medium by using a color electrostatic charge image developer.

Figure 2:
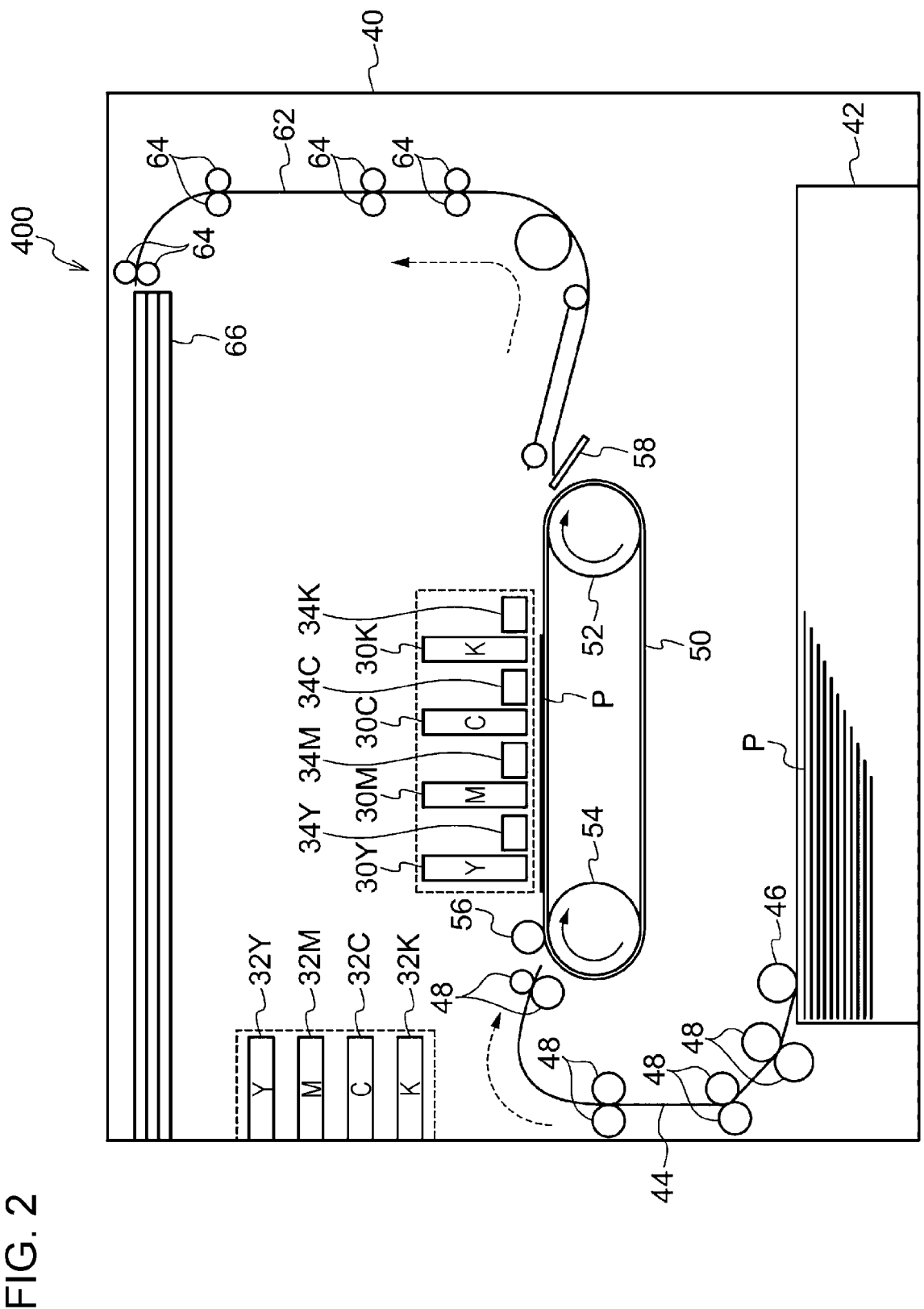
FIG. 2 is a schematic diagram illustrating an ink jet recording apparatus, which is one example of a color image forming unit.

An inkjet-type color image forming unit that serves as the color image forming unit will now be described with reference to the drawings. FIG. 2 illustrates an inkjet recording apparatus 400, which is an inkjet-type exemplary embodiment. The inkjet recording apparatus 400 is, for example, installed upstream of the applying unit 100 of the printed material production apparatus illustrated in FIG. 1.

The inkjet recording apparatus 400 includes, in a casing 40, a container 42 that stores recording media P before image recording, a endless conveying belt 50 stretched across a driving roll 52 and a driven roll 54, ink ejection heads 30Y, 30M, 30C, and 30K (these may be collectively referred to as ink ejection heads 30), drying units 34Y, 34M, 34C, and 34K (these may be collectively referred to as drying units 34), and a container 66 that stores recording media P after image recording.

A conveying path 44 through which the recording medium P before image recording is conveyed is disposed between the container 42 and the conveying belt 50, and a take-up roll 46 that takes one recording medium P at a time from the container 42, and multiple pairs of rolls 48 that convey the recording medium P are disposed along the conveying path 44. A charging roll 56 is disposed upstream of the conveying belt 50. The charging roll 56 is driven as it holds the recording medium P and the conveying belt 50 placed between the charging roll 56 and the driven roll 54, generates a potential difference with respect to the grounded driven roll 54, and provides charges to the recording medium P so that the recording medium P is electrostatically attracted to the conveying belt 50.

The ink ejection heads 30 are disposed above the conveying belt 50 and oppose the flat portion of the conveying belt 50. The regions where the ink ejection heads 30 and the conveying belt 50 oppose each other are the regions where ink droplets are ejected from the ink ejection heads 30.

The ink ejection heads 30Y, 30M, 30C, and 30K are, respectively, a head that records a yellow (Y) image, a head that records a magenta (M) image, a head that records a cyan (C) image, and a head that records a black (K) image. The ink ejection heads 30Y, 30M, 30C, and 30K are, for example, arranged in this order from the upstream side to the downstream side of the conveying belt 50. The ink ejection heads 30Y, 30M, 30C, and 30K are respectively linked, via supply tubes (not illustrated), to ink cartridges 32Y, 32M, 32C, and 32K of respective colors detachably attachable to the inkjet recording apparatus 400, and the inks of respective colors are supplied to the ink ejection heads from the ink cartridges.

Examples of the ink ejection heads 30 include long heads that have an effective recording region (region where nozzles ejecting inks are disposed) having a length equal to or larger than the width (the length in a direction orthogonal to the conveying direction of the recording medium P) of the recording medium P; and short heads that have an effective recording region having a length smaller than the width of the recording medium P and that move in the width direction of the recording medium P as they eject the inks.

Examples of the inkjet method employed by the ink ejection heads 30 include a piezoelectric system that utilizes the oscillating pressure from piezoelectric elements; a charge controlling system that ejects the ink by utilizing the electrostatic force of attraction; an acoustic inkjet system that transforms electrical signal into acoustic beams and radiates the acoustic beams to the ink to eject ink by utilizing the radiation pressure; and a thermal inkjet system that heats the ink to form bubbles and utilizes the pressure generated as a result.

The ink ejection heads 30 are, for example, low-resolution recording heads that eject ink droplets in the ink droplet amount range of 10 pL or more and 15 pL or less (for example, 600 dpi recording heads) or high-resolution recording heads that eject ink droplets in the ink droplet amount range of less than 10 pL (for example, 1200 dpi recording heads). Here, dpi means "dots per inch".

The inkjet recording apparatus 400 is not limited to a structure equipped with four ink ejection heads. The inkjet recording apparatus 400 may be equipped with more than four ink ejection heads to eject inks of Y, M, C, K, and additional intermediate colors, or may be equipped with one ink ejection head that forms a one-color image.

Drying units 34Y, 34M, 34C, and 34K that respectively correspond to the ink ejection heads of the respective colors are disposed downstream of the ink ejection heads 30 and above the conveying belt 50. Examples of the drying units 34 include contact-type heating units and hot air blowing units. The structure of the inkjet recording apparatus 400 is not limited to the structure in which one drying unit is provided for each ink ejection head of each color, and may be equipped with only one drying unit downstream of the most downstream ink ejection head.

A releasing plate 58 that opposes the driving roll 52 is disposed downstream of the drying units 34. The releasing plate 58 releases the recording medium P from the conveying belt 50.

A conveying path 62 through which the recording medium P after image recording is conveyed is disposed between the conveying belt 50 and the container 66, and multiple pairs of rolls 64 that convey the recording medium P are disposed along the conveying path 62.

The operation of the inkjet recording apparatus 400 will now be described.

The recording medium P before image recording is taken up by the roll 46 one by one from the container 42, and is conveyed to the conveying belt 50 by the multiple roll pairs 48. Next, the recording medium P is electrostatically attached to the conveying belt 50 by the charging roll 56, and conveyed to the underside of the ink ejection heads 30 by the rotation of the conveying belt 50. Next, the ink is ejected from the ink ejection heads 30 onto the recording medium P to record an image. Next, the ink on the recording medium P is dried by the drying units 34. Next, the recording medium P having a dried ink thereon and an image fixed thereon is released from the conveying belt 50 by the releasing plate 58, and is conveyed to the container 66 by the multiple roll pairs 64.

Sheet for producing printed material and method for producing sheet for producing printed material A sheet for producing a printed material according to an exemplary embodiment includes a substrate and pressure sensitive adhesive particles applied to the substrate. The sheet for producing a printed material according to this exemplary embodiment is produced by using the pressure sensitive adhesive particles of the exemplary embodiment. The pressure sensitive adhesive particles on the substrate may or may not keep the particle shape from before being applied to the substrate.

The sheet for producing a printed material according to this exemplary embodiment serves as, for example, a masking sheet to be placed on and bonded to a recording medium to conceal information recorded on the recording medium, or as a releasing sheet used to form an adhesive layer on a recording medium when recording media placed on top of each other are to be bonded.

Examples of the substrate that serves as the sheet for producing a printed material according to the exemplary embodiment include paper, coated paper obtained by coating the surface of paper with a resin or the like, cloths, nonwoven cloths, resin films, and resin sheets. The substrate may have an image formed on one or both surfaces.

In the sheet for producing a printed material according to this exemplary embodiment, the pressure sensitive adhesive particles may be applied to the entire surface of or one part of the substrate. One layer or two or more layers of the pressure sensitive adhesive particles are applied to the substrate. The layer of the pressure sensitive adhesive particles may be a layer continuous in the surface direction of the substrate or a layer discontinuous in the surface direction of the substrate. The layer of the pressure sensitive adhesive particles may be a layer in which the pressure sensitive adhesive particles are aligned as particles or a layer in which adjacent pressure sensitive adhesive particles are fused and aligned with each other.

The amount of the pressure sensitive adhesive particles on the substrate applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles on the substrate is, for example, 0.2 μm or more and 25 μm or less, 0.4 μm or more and 20 μm or less, or 0.6 μm or more and 15 μm or less.

The sheet for producing a printed material according to the exemplary embodiment is produced by, for example, a production method that includes an applying step of using the pressure sensitive adhesive particles of the exemplary embodiment and applying the pressure sensitive adhesive particles to a substrate.

The applying step includes, for example, a placing step of placing the pressure sensitive adhesive particles onto a substrate and, furthermore, a fixing step of fixing the pressure sensitive adhesive particles on the substrate onto the substrate.

The placing step is performed by a placing method such as a spraying method, a bar coating method, a die coating method, a knife coating method, a roll coating method, a reverse roll coating method, a gravure coating method, a screen printing method, an ink jet method, a lamination method, or an electrophotographic method, for example.

Depending on the placing method employed in the placing step, the pressure sensitive adhesive particles may be dispersed in a dispersion medium to prepare a liquid composition, and the liquid composition may be used the placing step.

The fixing step is, for example, a heating step of heating pressure sensitive adhesive particles on the substrate with a heating source to fix the pressure sensitive adhesive particles onto the substrate; a pressurizing step of pressurizing the substrate having the pressure sensitive adhesive particles placed thereon with a pair of pressurizing members (roll/roll or belt/roll) to fix the pressure sensitive adhesive particles onto the substrate; or a pressurizing and heating step of pressurizing and heating a substrate having the pressure sensitive adhesive particles placed thereon with a pair of pressurizing members (roll/roll or belt/roll) equipped with heating sources inside to fix the pressure sensitive adhesive particles onto the substrate.

Producing printed material by electrophotographic method An exemplary embodiment in which the pressure sensitive adhesive particles of the exemplary embodiment are used in the electrophotographic method will now be described. In the electrophotographic method, the pressure sensitive adhesive particles are used as a toner for developing an electrostatic charge image (may also be referred simply to as a "toner").

Electrostatic Charge Image Developer

An electrostatic charge image developer (may also be referred to as simply the "developer") of this exemplary embodiment contains at least the pressure sensitive adhesive particles of the exemplary embodiment. The electrostatic charge image developer of the exemplary embodiment may be a one-component developer that contains only the pressure sensitive adhesive particles of the exemplary embodiment or a two-component developer that is a mixture of the pressure sensitive adhesive particles of the exemplary embodiment and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles.

Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two-component developer, the pressure sensitive adhesive particle-to-carrier mixing ratio (mass ratio) is preferably 1:100 to 30:100 and is more preferably 3:100 to 20:100.

Apparatus and method for producing printed material An apparatus for producing a printed material according to an exemplary embodiment that employs an electrophotographic method includes an applying unit that stores a developer that contains the pressure sensitive adhesive particles of the exemplary embodiment and electrophotographically applies the pressure sensitive adhesive particles to a recording medium; and a pressure bonding unit that folds and pressure-bonds the recording medium or pressure-bonds the recording medium and another recording medium stacked on top of each other.

The method for producing a printed material of this exemplary embodiment by an electrophotographic method is performed by using the apparatus for producing a printed material of this exemplary embodiment. The method for producing a printed material according to an exemplary embodiment includes an applying step of electrophotographically applying pressure sensitive adhesive particles of the exemplary embodiment to a recording medium by using a developer that contains the pressure sensitive adhesive particles; and a pressure bonding step of folding and pressure-bonding the recording medium or pressure-bonding the recording medium and another recording medium stacked on top of each other.

The applying unit included in the apparatus for producing a printed material according to this exemplary embodiment includes, for example, a photoreceptor, a charging unit that charges a surface of the photoreceptor, an electrostatic charge image forming unit that forms an electrostatic charge image on the charged surface of the photoreceptor, a developing unit that stores the electrostatic charge image developer of the exemplary embodiment and develops the electrostatic charge image on the surface of the photoreceptor into a pressure sensitive adhesive particle portion by using the electrostatic charge image developer, and a transfer unit that transfers the pressure sensitive adhesive particle portion on the surface of the photoreceptor onto a surface of a recording medium.

The applying unit may further include a fixing unit that fixes the pressure sensitive adhesive particle portion which has been transferred onto the surface of the recording medium.

The applying step included in the method for producing a printed material according to this exemplary embodiment includes, for example, a charging step of charging a surface of the photoreceptor, an electrostatic charge image forming step of forming an electrostatic charge image on the charged surface of the photoreceptor, a developing step of developing the electrostatic charge image on the surface of the photoreceptor into a pressure sensitive adhesive particle portion by using the electrostatic charge image developer of the exemplary embodiment, and a transfer step of transferring the pressure sensitive adhesive particle portion on the surface of the photoreceptor onto a surface of a recording medium. The applying step may further include a fixing step of fixing the pressure sensitive adhesive particle portion on the surface of the recording medium.

The applying unit is, for example, a direct transfer type device with which a pressure sensitive adhesive particle portion on the surface of the photoreceptor is directly transferred onto a recording medium; an intermediate transfer type device with which a pressure sensitive adhesive particle portion on the surface of the photoreceptor is first transferred onto a surface of an intermediate transfer body and then the pressure sensitive adhesive particle portion on the intermediate transfer body is transferred onto a surface of a recording medium; a device equipped with a cleaning unit that cleans the surface of the photoreceptor before charging and after the transfer of the pressure sensitive adhesive particle portion; and a device equipped with a charge erasing unit that erases charges on the surface of the photoreceptor by applying charge erasing light after the transfer of the pressure sensitive adhesive particle portion and before charging. When the applying unit is of an intermediate transfer type, the transfer unit includes, for example, an intermediate transfer body having a surface onto which a pressure sensitive adhesive particle portion is transferred, a first transfer unit that transfers the pressure sensitive adhesive particle portion on the surface of the photoreceptor onto the surface of the intermediate transfer body, and a second transfer unit that transfers the pressure sensitive adhesive particle portion on the surface of the intermediate transfer body onto a surface of a recording medium.

A portion of the applying unit that includes the developing unit may be configured as a cartridge structure (process cartridge) that is detachably attachable to the applying unit. A process cartridge that stores the electrostatic charge image developer of the exemplary embodiment and is equipped with a developing unit, for example, is suitable as this process cartridge.

The pressure bonding unit included in the apparatus for producing a printed material according to this exemplary embodiment applies a pressure to a recording medium to which the pressure sensitive adhesive particles of the exemplary embodiment have been applied. In this manner, the pressure sensitive adhesive particles of the exemplary embodiment become fluidized and exhibit adhesiveness on the recording medium. The pressure that the pressure bonding unit applies to the recording medium to fluidize the pressure sensitive adhesive particles of the exemplary embodiment is preferably 3 MPa or more and 300 MPa or less, more preferably 10 MPa or more and 200 MPa or less, and yet more preferably 30 MPa or more and 150 MPa or less.

The pressure sensitive adhesive particles of the exemplary embodiment may be applied to the entire surface of the recording medium or one part of the recording medium. One layer or two or more layers of the pressure sensitive adhesive particles of the exemplary embodiment are applied to the recording medium. The layer of the pressure sensitive adhesive particles of the exemplary embodiment may be a layer continuous in the surface direction of the recording medium or a layer discontinuous in the surface direction of the recording medium. The layer of the pressure sensitive adhesive particles according to the exemplary embodiment may be a layer in which the pressure sensitive adhesive particles are aligned as particles or a layer in which adjacent pressure sensitive adhesive particles are fused and aligned with each other.

The amount of the pressure sensitive adhesive particles (preferably, transparent pressure sensitive adhesive particles) of the exemplary embodiment on the recording medium and applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles (preferably, transparent pressure sensitive adhesive particles) of the exemplary embodiment on the recording medium is, for example, 0.2 µm or more and 25 µm or less, 0.4 µm or more and 20 µm or less, or 0.6 µm or more and 15 µm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces.

Although some examples of the apparatus for producing a printed material according to the exemplary embodiment employing an electrophotographic system are described below, the exemplary embodiments are not limited to these.

Figure 3:
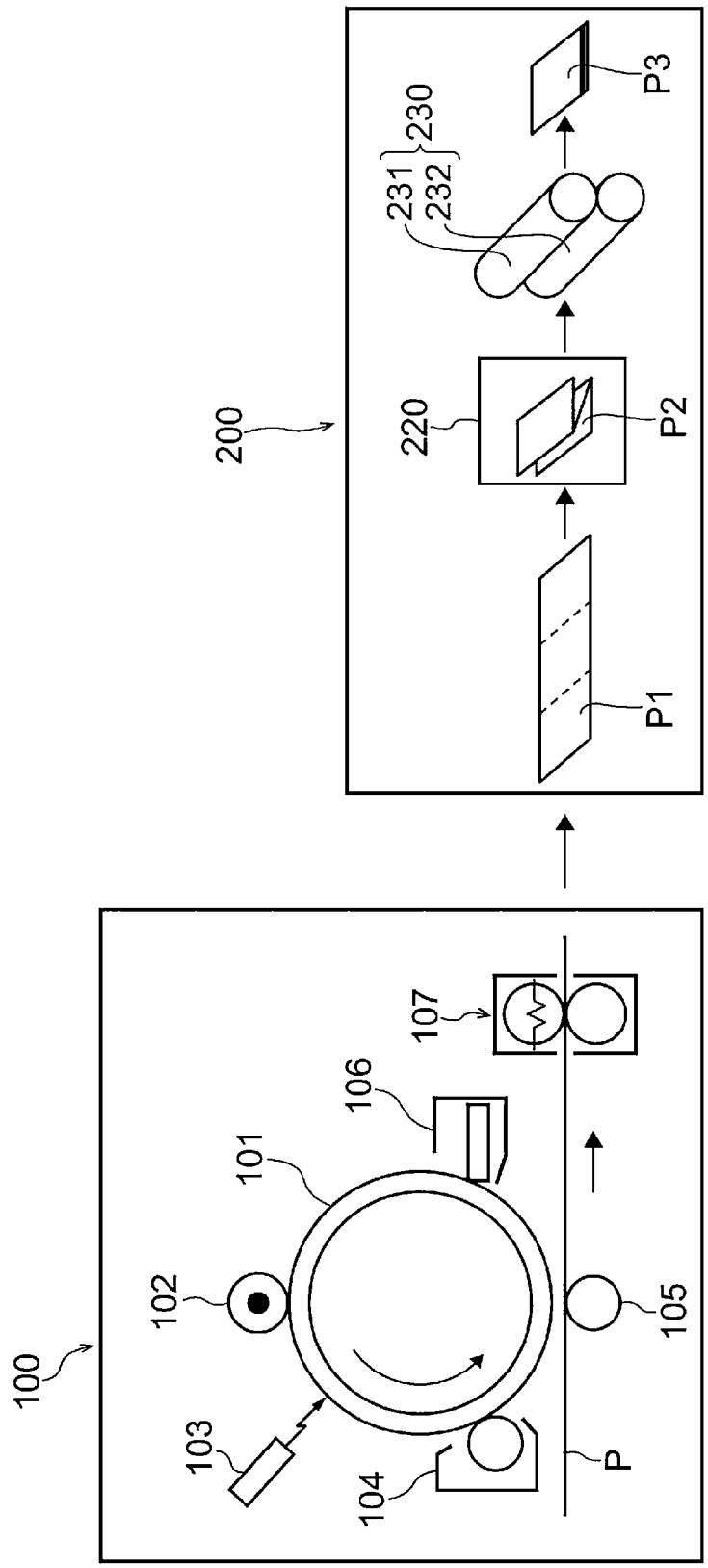
FIG. 3 is a schematic diagram illustrating another example of the apparatus for producing a printed material according to an exemplary embodiment.

FIG. 3 is a schematic diagram of an example of an apparatus for producing a printed material according to this exemplary embodiment. The apparatus for producing a printed material illustrated in FIG. 3 is equipped with an applying unit 100 and a pressure bonding unit 200 downstream of the applying unit 100. The arrow indicates the direction in which the photoreceptor rotates or the recording medium is conveyed.

The applying unit 100 is of a direct transfer type and uses a developer containing the pressure sensitive adhesive particles of the exemplary embodiment to electrophotographically apply the pressure sensitive adhesive particles of the exemplary embodiment to a recording medium P. The recording medium P has an image formed on one or both surfaces in advance.

The applying unit 100 includes a photoreceptor 101. A charging roll (one example of the charging unit) 102 that charges the surface of the photoreceptor 101, an exposing device (one example of the electrostatic charge image forming unit) 103 that forms an electrostatic charge image by exposing the charged surface of the photoreceptor 101 with a laser beam, a developing device (one example of the developing unit) 104 that develops the electrostatic charge image by supplying pressure sensitive adhesive particles to the electrostatic charge image, a transfer roll (one example of the transfer unit) 105 that transfers the developed pressure sensitive adhesive particle portion onto the recording medium P, and a photoreceptor cleaning device (one example of the cleaning unit) 106 that removes the pressure sensitive adhesive particles remaining on the surface of the photoreceptor 101 after the transfer are disposed around the photoreceptor 101.

The operation of the applying unit 100 applying the pressure sensitive adhesive particles of the exemplary embodiment to the recording medium P will now be described.

First, the surface of the photoreceptor 101 is charged by the charging roll 102. The exposing device 103 applies a laser beam onto the charged surface of the photoreceptor 101 in accordance to image data sent from a controller (not illustrated). As a result, an electrostatic charge image of an application pattern of the pressure sensitive adhesive particles of this exemplary embodiment is formed on the surface of the photoreceptor 101.

The electrostatic charge image formed on the photoreceptor 101 is rotated to a developing position as the photoreceptor 101 is run. The electrostatic charge image on the photoreceptor 101 is developed by the developing device 104 at this developing position so as to form a pressure sensitive adhesive particle portion.

A developer that contains at least the pressure sensitive adhesive particles of this exemplary embodiment and a carrier is stored in the developing device 104. The pressure sensitive adhesive particles of this exemplary embodiment are frictionally charged as they are stirred with the carrier in the developing device 104, and are carried on the developer roll. As the surface of the photoreceptor 101 passes the developing device 104, the pressure sensitive adhesive particles electrostatically adhere to the electrostatic charge image on the surface of the photoreceptor 101, and the electrostatic charge image is thereby developed with the pressure sensitive adhesive particles. The photoreceptor 101 on which the pressure sensitive adhesive particle portion has been formed is continuously run, and the pressure sensitive adhesive particle portion on the photoreceptor 101 is conveyed to a transfer position.

After the pressure sensitive adhesive particle portion on the photoreceptor 101 is conveyed to the transfer position, a transfer bias is applied to the transfer roll 105. An electrostatic force working from the photoreceptor 101 toward the transfer roll 105 also acts on the pressure sensitive adhesive particle portion, and, thus, the pressure sensitive adhesive particle portion on the photoreceptor 101 is transferred onto the recording medium P.

The pressure sensitive adhesive particles remaining on the photoreceptor 101 are removed by the photoreceptor cleaning device 106 and recovered. The photoreceptor cleaning device 106 is, for example, a cleaning blade or a cleaning brush. From the viewpoint of suppressing the phenomenon in which the pressure sensitive adhesive particles of the exemplary embodiment remaining on the surface of the photoreceptor fluidize under a pressure and attach to the surface of the photoreceptor while forming a film, the photoreceptor cleaning device 106 may be a cleaning brush.

The recording medium P onto which the pressure sensitive adhesive particle portion has been transferred is conveyed to a fixing device (one example of the fixing unit) 107. The fixing device 107 is, for example, a pair of fixing members (roll/roll or belt/roll). The applying unit 100 need not be equipped with a fixing device 107; however, from the viewpoint of suppressing detachment of the pressure sensitive adhesive particles of the exemplary embodiment from the recording medium P, the applying unit 100 is preferably equipped with a fixing device 107. The pressure which the fixing device 107 applies to the recording medium P may be lower than the pressure which the pressurizing device 230 applies to the recording medium P2, and may specifically be 0.2 MPa or more and 1 MPa or less.

The fixing device 107 may have a heating source (for example, a halogen heater) for heating the recording medium P inside, but this is optional. When the fixing device 107 has a heating source inside, the surface temperature of the recording medium P heated by the heating source is preferably 150° C. or more and 220° C. or less, more preferably 155° C. or more and 210° C. or less, and yet more preferably 160° C. or more and 200° C. or less. The fixing device 107 may have no heating source inside, and this does not exclude that the temperature inside the fixing device 107 increases to a temperature equal to or more than the environment temperature due to heat from a motor in the applying unit 100 or the like.

The recording medium P that has passed the applying unit 100 turns into a recording medium P1 having pressure sensitive adhesive particles of the exemplary embodiment applied on the image. The recording medium P1 is conveyed toward the pressure bonding unit 200.

In the apparatus for producing a printed material according to this exemplary embodiment, the applying unit 100 and the pressure bonding unit 200 may be close to each other or distant from each other. When the applying unit 100 and the pressure bonding unit 200 are distant from each other, the applying unit 100 and the pressure bonding unit 200 are, for example, linked via a conveying unit (for example, a belt conveyor) that conveys the recording medium P1.

The pressure bonding unit 200 is equipped with a folding device 220 and a pressurizing device 230, and folds and pressure-bonds the recording medium P1.

The folding device 220 folds the recording medium P1 passing therethrough to prepare a folded recording medium P2. The recording medium P2 may be folded in two, in three, or in four, and may be folded only partly. The pressure sensitive adhesive particles of the exemplary embodiment are applied to at least part of at least one of the opposing surfaces of the recording medium P2.

The folding device 220 may have a pair of pressurizing members (for example, roll/roll or belt/roll) that apply a pressure to the recording medium P2. The pressure which the pressurizing members of the folding device 220 apply to the recording medium P may be lower than the pressure which the pressurizing device 230 applies to the recording medium P2, and may specifically be 1 MPa or more and 10 MPa or less.

The pressure bonding unit 200 may be equipped with a stacking device that stacks another recording medium on top of the recording medium P1 instead of the folding device 220. Examples of the way in which the recording medium P1 and the additional recording medium are stacked on top of each other include stacking one recording medium on the recording medium P1, and stacking one recording medium on each of multiple regions in the recording medium P1. This additional recording medium may have an image formed on one or both surfaces in advance, may be free of any image, or may be a pressure-bonded printed material prepared in advance.

The recording medium P2 exits the folding device 220 (or stacking device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls, and may be a combination of a pressurizing roll and a pressurizing belt or a combination of a pressurizing belt and a pressurizing belt.

When a pressure is applied to the recording medium P2 passing the pressurizing device 230, the pressure sensitive adhesive particles of the exemplary embodiment on the recording medium P2 are fluidized under pressure and exhibit adhesiveness. The pressure that the pressurizing device 230 applies to the recording medium P2 is preferably 3 MPa or more and 300 MPa or less, more preferably 10 MPa or more and 200 MPa or less, and yet more preferably 30 MPa or more and 150 MPa or less.

The pressurizing device 230 may have a heating source (for example, a halogen heater) inside for heating the recording medium P2, but this is optional. When the pressurizing device 230 has a heating source inside, the surface temperature of the recording medium P2 heated by the heating source is preferably 30° C. or more and 120° C. or less, more preferably 40° C. or more and 100° C. or less, and yet more preferably 50° C. or more and 90° C. or less. The pressurizing device 230 may have no heating source inside, and this does not exclude that the temperature inside the pressurizing device 230 increases to a temperature equal to or more than the environment temperature due to heat from a motor in the pressurizing device 230 or the like.

As the recording medium P2 passes the pressurizing device 230, the opposing folded surfaces bond with each other with the fluidized pressure sensitive adhesive particles of the exemplary embodiment, and a pressure-bonded printed material P3 is obtained. The opposing surfaces of the pressure-bonded printed material P3 are partly or entirely bonded to each other.

The finished pressure-bonded printed material P3 is discharged from the pressurizing device 230.

A first form of the pressure-bonded printed material P3 is formed of a folded recording medium having opposing surfaces bonded with the pressure sensitive adhesive particles of the exemplary embodiment. The pressure-bonded printed material P3 of this form is produced by the apparatus for producing a printed material equipped with a folding device 220.

A second form of the pressure-bonded printed material P3 is formed of multiple recording media stacked on top of each other and having opposing surfaces bonded with the pressure sensitive adhesive particles of the exemplary embodiment. The pressure-bonded printed material P3 of this form is produced by the pressure-bonded printed material producing apparatus equipped with a stacking device.

The apparatus for producing a printed material according to this exemplary embodiment is not limited to a type that continuously conveys the recording medium P2 from the folding device 220 (or stacking device) to the pressurizing device 230. The apparatus for producing a printed material according to this exemplary embodiment may be of a type that stocks the recording media P2 discharged from the folding device 220 (or stacking device) and conveys the recording media P2 to the pressurizing device 230 after a predetermined amount of the recording media P2 are stored.

In the apparatus for producing a printed material according to this exemplary embodiment, the folding device 220 (or stacking device) and the pressurizing device 230 may be close to each other or distant from each other. When the folding device 220 (or stacking device) and the pressurizing device 230 are distant from each other, the folding device 220 (or stacking device) and the pressurizing device 230 are, for example, linked via a conveying unit (for example, a belt conveyor) that conveys the recording medium P2.

The apparatus for producing a printed material according to this exemplary embodiment may be equipped with a cutting unit that cuts the recording medium into a predetermined size. Examples of the cutting unit include a cutting unit that is disposed between the applying unit 100 and the pressure bonding unit 200 and cuts off a part of the recording medium P1, the part being a region where no pressure sensitive adhesive particles of the exemplary embodiment are applied; a cutting unit that is disposed between the folding device 220 and the pressurizing device 230 and cuts off a part of the recording medium P2, the part being a region where no pressure sensitive adhesive particles of the exemplary embodiment are applied; and a cutting unit that is disposed downstream of the pressure bonding unit 200 and cuts off a part of the pressure-bonded printed material P3, the part being a region not bonded with the pressure sensitive adhesive particles of the exemplary embodiment.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size.

The apparatus for producing a printed material according to this exemplary embodiment may further include a color image forming unit that forms a color image on a recording medium by an electrophotographic method by using a color electrostatic charge image developer. The color image forming unit is equipped with, for example, a photoreceptor, a charging unit that charges a surface of the photoreceptor, an electrostatic charge image forming unit that forms an electrostatic charge image on the charged surface of the photoreceptor, a developing unit that stores a color electrostatic charge image developer and develops the electrostatic charge image on the surface of the photoreceptor into a color toner image by using the color electrostatic charge image developer, a transfer unit that transfers the color toner image on the surface of the photoreceptor onto a surface of a recording medium, and a thermal fixing unit that thermally fixes the color toner image transferred onto the surface of the recording medium.

The above-described production apparatus is used to implement the method for producing a printed material of the exemplary embodiment, the method further including a color image forming step of forming a color image on the recording medium by an electrophotographic method using a color electrostatic charge image developer. The color image forming step includes, specifically, a charging step of charging a surface of a photoreceptor, an electrostatic charge image forming step of forming an electrostatic charge image on the charged surface of the photoreceptor, a developing step of developing the electrostatic charge image on the surface of the photoreceptor into a color toner image by using a color electrostatic charge image developer, a transfer step of transferring the color toner image on the surface of the photoreceptor onto a surface of a recording medium, and a thermal fixing step of thermally fixing the color toner image transferred onto the surface of the recording medium.

Examples of the color image forming unit included in the apparatus for producing a printed material according to the exemplary embodiment include: a direct transfer type device with which a color toner image on the surface of the photoreceptor is directly transferred onto a recording medium; an intermediate transfer type device with which a color toner image on the surface of the photoreceptor is first transferred onto a surface of an intermediate transfer body and then the color toner image on the intermediate transfer body is transferred onto a surface of a recording medium; a device equipped with a cleaning unit that cleans the surface of the photoreceptor before charging and after the transfer of the color toner image; and a device equipped with a charge erasing unit that erases charges on the surface of the photoreceptor by applying charge erasing light after the transfer of the color toner image and before charging. When the color image forming unit is an intermediate transfer type device, the transfer unit has, for example, an intermediate transfer body having a surface to which a color toner image is transferred, a first transfer unit that transfers (first transfer) the color toner image on the surface of the photoreceptor onto a surface of the intermediate transfer body, and a second transfer unit that transfers (second transfer) the color toner image on the surface of the intermediate transfer body onto a surface of a recording medium.

In the apparatus for producing a printed material according to this exemplary embodiment, when the applying unit for applying a developer containing the pressure sensitive adhesive particles of the exemplary embodiment and a color image forming unit both employ an intermediate transfer method, the applying unit and the color image forming unit may share the intermediate transfer body and the second transfer unit.

In the apparatus for producing a printed material according to this exemplary embodiment, the applying unit that applies an image developer containing the pressure sensitive adhesive particles of the exemplary embodiment and the color image forming unit may share the thermal fixing unit.

Other examples of the apparatus for producing a printed material according to the exemplary embodiment equipped with a color image forming unit are described below, but these examples are not limiting. Only relevant parts illustrated in the drawing are described in the description below, and descriptions of other parts are omitted.

Figure 4:
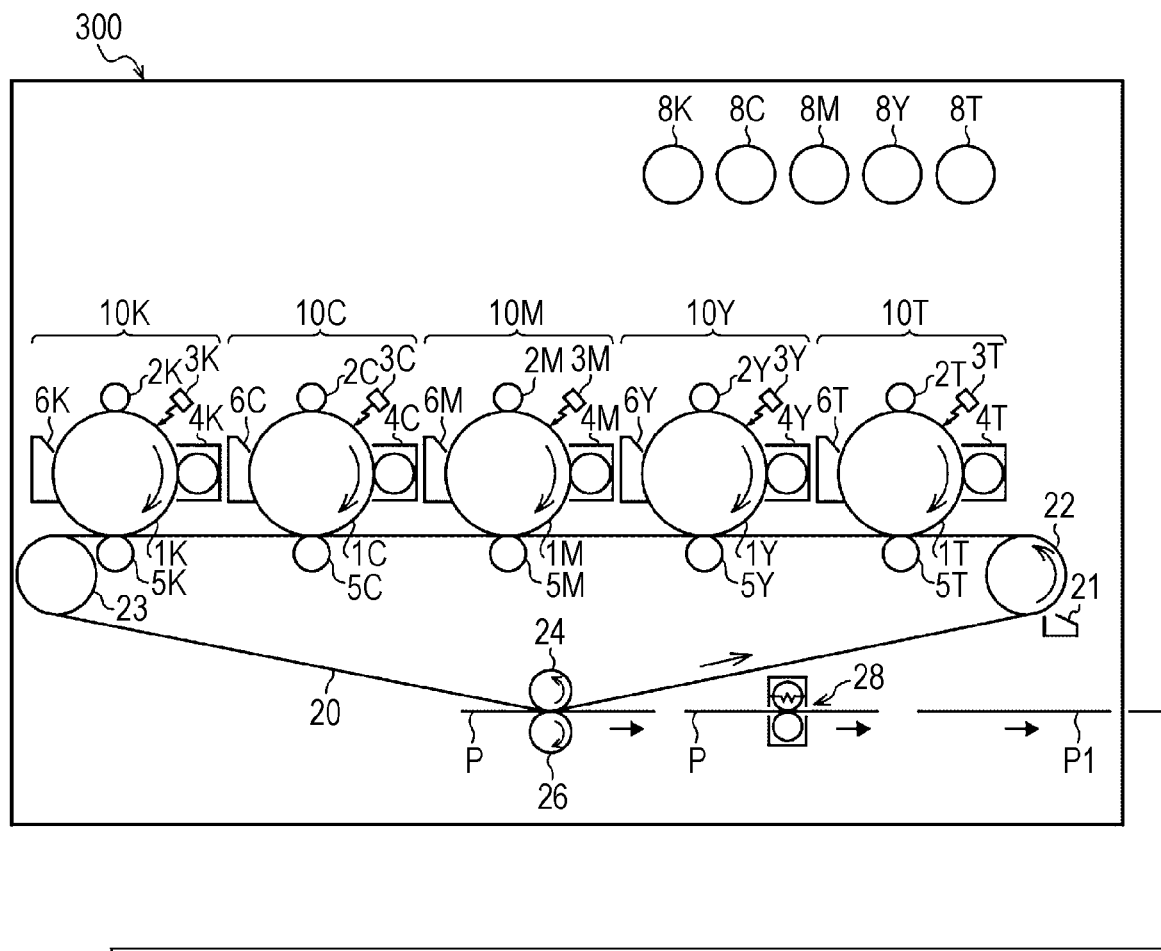
FIG. 4 is a schematic diagram illustrating another example of the apparatus for producing a printed material according to an exemplary embodiment.
Figure 4:
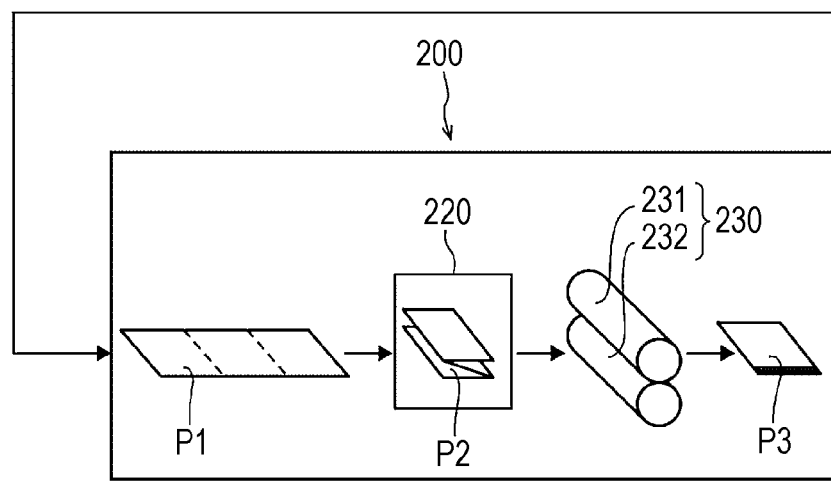

FIG. 4 is a schematic diagram of an example of an apparatus for producing a printed material according to this exemplary embodiment employing an electrophotographic system. The apparatus for producing a printed material illustrated in FIG. 4 is equipped with a printing unit 300 that applies the pressure sensitive adhesive particles of the exemplary embodiment to a recording medium and forms a color image on the recording medium, and a pressure bonding unit 200 disposed downstream of the printing unit 300.

The printing unit 300 is a five-stand-tandem intermediate transfer-type printing unit. The printing unit 300 is equipped with a unit 10T that applies the pressure sensitive adhesive particles (T) of the exemplary embodiment, and units 10Y, 10M, 10C, and 10K that respectively form yellow (Y), magenta (M), cyan (C) black (K) images. The unit 10T is the applying unit that applies the pressure sensitive adhesive particles of the exemplary embodiment to the recording medium P by using a developer that contains the pressure sensitive adhesive particles of the exemplary embodiment. Each of the units 10Y, 10M, 10C, and 10K is a unit that forms a color image on the recording medium P by using a developer that contains a color toner.

The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing unit 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing units) 4T, 4Y, 4M, 4C, and 4K. The pressure sensitive adhesive particles of the exemplary embodiment stored in the pressure sensitive adhesive particle cartridge 8T, and, a yellow toner, a magenta toner, a cyan toner, and a black toner stored in the cartridges 8Y, 8M, 8C, and 8K are respectively supplied to the developing devices 4T, 4Y, 4M, 4C, and 4K.

Since the units 10T, 10Y, 10M, 10C and 10K are identical in structure and in operation, the unit 10T that applies the pressure sensitive adhesive particles of this exemplary embodiment to the recording medium is described as a representative example.

The unit 10T has a photoreceptor 1T. A charging roll (one example of the charging unit) 2T that charges the surface of the photoreceptor 1T, an exposing device (one example of the electrostatic charge image forming unit) 3T that forms an electrostatic charge image by exposing the charged surface of the photoreceptor 1T with a laser beam, a developing device (one example of the developing unit) 4T that develops the electrostatic charge image by supplying pressure sensitive adhesive particles to the electrostatic charge image, a first transfer roll (one example of the first transfer unit) 5T that transfers the developed pressure sensitive adhesive particle portion onto the intermediate transfer belt 20, and a photoreceptor cleaning device (one example of the cleaning unit) 6T that removes the pressure sensitive adhesive particles remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of applying the pressure sensitive adhesive particles of the exemplary embodiment and formation of a color image on the recording medium P is described by using the operation of the unit 10T as an example.

First, the surface of the photoreceptor 1T is charged by the charging roll 2T. The developing device 3T applies a laser beam onto the charged surface of the photoreceptor 1T in accordance to image data sent from a controller (not illustrated). As a result, an electrostatic charge image of an application pattern of the pressure sensitive adhesive particles of this exemplary embodiment is formed on the surface of the photoreceptor 1T.

The electrostatic charge image formed on the photoreceptor 1T is rotated to a developing position as the photoreceptor 1T is run. The electrostatic charge image on the photoreceptor 1T is developed by the developing device 4T at this developing position so as to form a pressure sensitive adhesive particle portion.

A developer that contains at least the pressure sensitive adhesive particles of this exemplary embodiment and a carrier is stored in the developing device 4T. The pressure sensitive adhesive particles of this exemplary embodiment are frictionally charged as they are stirred with the carrier in the developing device 4T, and are carried on the developer roll. As the surface of the photoreceptor 1T passes the developing device 4T, the pressure sensitive adhesive particles electrostatically adhere to the electrostatic charge image on the surface of the photoreceptor 1T, and the electrostatic charge image is thereby developed with the pressure sensitive adhesive particles. The photoreceptor 1T on which the pressure sensitive adhesive particle portion has been formed is continuously run, and the pressure sensitive adhesive particle portion on the photoreceptor 1T is conveyed to a first transfer position.

After the pressure sensitive adhesive particle portion on the photoreceptor 1T is conveyed to the first transfer position, a first transfer bias is applied to the first transfer roll 5T. An electrostatic force working from the photoreceptor 1T toward the first transfer roll 5T also acts on the pressure sensitive adhesive particle portion, and, thus, the pressure sensitive adhesive particle portion on the photoreceptor 1T is transferred onto the intermediate transfer belt 20. The pressure sensitive adhesive particles remaining on the photoreceptor 1T are removed by the photoreceptor cleaning device 6T and recovered. The photoreceptor cleaning device 6T is, for example, a cleaning blade or a cleaning brush, and is preferably a cleaning brush.

An operation similar to that performed in the unit 10T is also performed in the units 10Y, 10M, 10C, and 10K by using developers that contain color toners. The intermediate transfer belt 20 onto which the pressure sensitive adhesive particle portion has been transferred in the unit 10T sequentially passes the units 10Y, 10M, 10C, and 10K, and toner images of respective colors are transferred (multi-layer transfer) onto the intermediate transfer belt 20.

The intermediate transfer belt 20 onto which the pressure sensitive adhesive particle portion and the toner images are transferred and superposed as the intermediate transfer belt 20 passes the units 10T, 10Y, 10M, 10C, and 10K reaches a second transfer portion constituted by the intermediate transfer belt 20, the counter roll 24 in contact with the inner surface of the intermediate transfer belt 20, and a second transfer roll (one example of the second transfer unit) 26 disposed on the image carrying surface side of the intermediate transfer belt 20.

Meanwhile, a recording medium P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P and the toner images acts on the pressure sensitive adhesive particle portion, and the pressure sensitive adhesive particle portion and the toner images on the intermediate transfer belt 20 are transferred onto the recording medium P.

The recording medium P onto which the pressure sensitive adhesive particle portion and the toner images have been transferred is conveyed to a thermal fixing device (one example of the thermal fixing unit) 28. The thermal fixing device 28 is equipped with a heating source such as a halogen heater, and heats the recording medium P. The surface temperature of the recording medium P when heated by the thermal fixing device 28 is preferably 150° C. or more and 220° C. or less, more preferably 155° C. or more and 210° C. or less, and yet more preferably 160° C. or more and 200° C. or less. As the recording medium P passes the thermal fixing device 28, the color toner images are thermally fixed to the recording medium P.

From the viewpoints of suppressing detachment of the pressure sensitive adhesive particles of the exemplary embodiment from the recording medium P and improving the fixability of the color image to the recording medium P, the thermal fixing device 28 may be a device that applies heat and pressure, for example, a pair of fixing members (roll/roll or belt/roll) equipped with heating sources inside. When the thermal fixing device 28 is to apply pressure, the pressure which the thermal fixing device 28 applies to the recording medium P may be lower than the pressure which the pressurizing device 230 applies to the recording medium P2, and may specifically be 0.2 MPa or more and 1 MPa or less.

The recording medium P passes the printing unit 300 and turns into a recording medium P1 on which color images and the pressure sensitive adhesive particles of the exemplary embodiment are placed. The recording medium P1 is conveyed toward the pressure bonding unit 200.

The structure of the pressure bonding unit 200 illustrated in FIG. 4 may be the same as that of the pressure bonding unit 200 illustrated in FIG. 3, and the detailed descriptions of the structure and the operation of the pressure bonding unit 200 are omitted.

In the apparatus for producing a printed material according to this exemplary embodiment, the printing unit 300 and the pressure bonding unit 200 may be close to each other or distant from each other. When the printing unit 300 and the pressure bonding unit 200 are distant from each other, the printing unit 300 and the pressure bonding unit 200 are, for example, linked via a conveying unit (for example, a belt conveyor) that conveys the recording medium P1.

The apparatus for producing a printed material according to this exemplary embodiment may be equipped with a cutting unit that cuts the recording medium into a predetermined size. Examples of the cutting unit include a cutting unit that is disposed between the printing unit 300 and the pressure bonding unit 200 and cuts off a part of the recording medium P1, the part being a region where no pressure sensitive adhesive particles of the exemplary embodiment are applied; a cutting unit that is disposed between the folding device 220 and the pressurizing device 230 and cuts off a part of the recording medium P2, the part being a region where no pressure sensitive adhesive particles of the exemplary embodiment are applied; and a cutting unit that is disposed downstream of the pressure bonding unit 200 and cuts off a part of the pressure-bonded printed material P3, the part being a region not bonded with the pressure sensitive adhesive particles of the exemplary embodiment.

The apparatus for producing a printed material according to this exemplary embodiment is not limited to a single-sheet type. The apparatus for producing a printed material according to this exemplary embodiment may be of a type that performs a color image forming step, an applying step, and a pressure bonding step on a long recording medium to form a long pressure-bonded printed material, and then cuts the long pressure-bonded printed material into a predetermined size.

Process Cartridge

A process cartridge used in an apparatus for producing a printed material by an electrophotographic method will now be described.

A process cartridge according to an exemplary embodiment is equipped with a developing unit that stores the electrostatic charge image developer of the exemplary embodiment and develops an electrostatic charge image on the surface of a photoreceptor into a pressure sensitive adhesive particle portion by using the electrostatic charge image developer, and is detachably attached to the apparatus for producing a printed material.

The process cartridge of this exemplary embodiment may be configured to include a developing unit and, if needed, at least one selected from a photoreceptor, a charging unit, an electrostatic charge image forming unit, a transfer unit, and other units.

An example of the process cartridge is a cartridge in which a photoreceptor, and a charging roll (one example of the charging unit), a developing device (one example of the developing unit), and a photoreceptor cleaning device (one example of the cleaning unit) disposed around the photoreceptor are integrated by a casing. The casing has an opening to allow exposure. The casing has an installation rail, and the process cartridge is installed to the apparatus for producing a printed material by using the installation rail.

EXAMPLES

The exemplary embodiments of the present disclosure will now be described in detail through examples, but the present disclosure is not limited by these examples. In the description below, "parts" and "%" are on a mass basis unless otherwise noted.

Preparation of Dispersion Containing Styrene Resin Particles

Preparation of Styrene Resin Particle Dispersion (St1)

Styrene: 390 parts n-Butyl acrylate: 100 parts

Acrylic acid: 10 parts

Dodecanethiol: 7.5 parts

The above-described materials are mixed and dissolved to prepare a monomer solution.

In 205 parts of ion exchange water, 8 parts of an anionic surfactant (DOWFAX 2A1 produced by The Dow Chemical Company) is dissolved, and is dispersed and emulsified by adding the aforementioned monomer solution to obtain an emulsion.

In 462 parts of ion exchange water, 2.2 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube and is heated to 73° C. under stirring, and the temperature is retained thereat.

In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump.

Subsequently, while slow stirring is continued, the polymerization flask is retained at 75° C. for 3 hours, and then the temperature is returned to room temperature.

As a result, a styrene resin particle dispersion (St1) that contains styrene resin particles having a volume-average particle diameter (D50 v) of 174 nm, a weight-average molecular weight of 49000 as determined by GPC (UV detection), and a glass transition temperature of 54° C., and that has a solid content of 42% is obtained.

The styrene resin particle dispersion (St1) is dried to obtain styrene resin particles, and the thermal behavior in the temperature range of −100° C. to 100° C. is analyzed with a differential scanning calorimeter (DSC-60A produced by Shimadzu Corporation). One glass transition temperature is observed. Table 1 indicates the glass transition temperatures.

Preparation of Styrene Resin Particle Dispersions (St2) to (St13)

Styrene resin particle dispersions (St2) to (St13) are prepared as with the preparation of the styrene resin particle dispersion (St1) except that the monomers are changed as indicated in Table 1.

The compositions and the physical properties of the styrene resin particle dispersion (St1) etc., are indicated in Table 1. In Table 1, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA

TABLE 1

Styrene resin particle dispersion

| No. | St | BA | 2EHA | EA | 4HBA | AA | MAA | CEA | D50v of resin particles nm | Mw (k) | Tg °C. |
|---|---|---|---|---|---|---|---|---|---|---|---|
| St1 | 78 | 20 | 0 | 0 | 0 | 2 | 0 | 0 | 174 | 49 | 54 |
| St2 | 88 | 10 | 0 | 0 | 0 | 2 | 0 | 0 | 170 | 50 | 76 |
| St3 | 83 | 15 | 0 | 0 | 0 | 2 | 0 | 0 | 172 | 52 | 65 |
| St4 | 78 | 20 | 0 | 0 | 0 | 0 | 2 | 0 | 177 | 48 | 57 |
| St5 | 80 | 15 | 0 | 0 | 5 | 0 | 0 | 0 | 172 | 46 | 55 |
| St6 | 80 | 15 | 5 | 0 | 0 | 0 | 0 | 0 | 174 | 51 | 54 |
| St7 | 80 | 20 | 0 | 0 | 0 | 0 | 0 | 0 | 169 | 50 | 54 |
| St8 | 77 | 20 | 0 | 0 | 0 | 0 | 0 | 3 | 168 | 48 | 54 |
| St9 | 72 | 26 | 0 | 0 | 0 | 2 | 0 | 0 | 172 | 55 | 43 |
| St10 | 68 | 30 | 0 | 0 | 0 | 2 | 0 | 0 | 173 | 53 | 35 |
| St11 | 80 | 0 | 20 | 0 | 0 | 0 | 0 | 0 | 171 | 52 | 56 |
| St12 | 78 | 0 | 20 | 0 | 0 | 2 | 0 | 0 | 167 | 49 | 56 |
| St13 | 63 | 0 | 0 | 35 | 0 | 2 | 0 | 0 | 169 | 51 | 54 |

Preparation of Dispersion Containing Composite Resin Particles
Preparation of Composite Resin Particle Dispersion (M1)
 Styrene resin particle dispersion (St1): 1190 parts (solid content: 500 parts)
 2-Ethylhexyl acrylate: 250 parts
 n-Butyl acrylate: 250 parts
 Ion exchange water: 982 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask over a period of 60 minutes via a metering pump.

Subsequently, while slow stirring is continued, the polymerization flask is retained at 70° C. for 3 hours, and then the temperature is returned to room temperature.

As a result, a composite resin particle dispersion (M1) that contains composite resin particles having a volume-average particle diameter (D50 v) of 219 nm and a weight-average molecular weight of 219000 as determined by GPC (UV detection) and that has a solid content of 32% is obtained.

The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 2 indicates the glass transition temperatures.

Preparation of Composite Resin Particle Dispersions (M2) to (M21) and (cM1) to (cM3)

Composite resin particle dispersions (M2) to (M21) and (cM1) to (cM3) are prepared as with the preparation of the composite resin particle dispersion (M1) except that the styrene resin particle dispersion (St1) is changed as described in Table 2 or that the polymerization components of the (meth)acrylate resin are changed as described in Table 2.

The compositions and the physical properties of the composite resin particle dispersion (M1) etc., are indicated in Table 2. In Table 2, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA

TABLE 2

Composite resin particle dispersion

| No. | St resin particle dispersion | St resin Polymerization components | Tg °C. | Ac resin Polymerization components | Ac resin mass ratio (St:Ac) | St resin-to-resin particles nm | D50v of Mw (k) | Tg °C. | Tg °C. |
|---|---|---|---|---|---|---|---|---|---|
| cM1 | St1 | St/BA/AA = 78/20/2 | 54 | 2EHA = 100 | 50:50 | 222 | 230 | −50 | 54 |
| cM2 | St1 | St/BA/AA = 78/20/2 | 54 | BA = 100 | 50:50 | 225 | 220 | −53 | 54 |
| cM3 | St12 | St/2EHA/AA = 78/20/2 | 56 | BA = 100 | 50:50 | 224 | 212 | −53 | 56 |
| M1 | St1 | St/BA/AA = 78/20/2 | 54 | 2EHA/BA = 50/50 | 50:50 | 219 | 219 | −52 | 54 |
| M2 | St2 | St/BA/AA = 88/10/2 | 76 | 2EHA/BA = 50/50 | 50:50 | 218 | 240 | −52 | 76 |
| M3 | St3 | St/BA/AA = 83/15/2 | 65 | 2EHA/BA = 50/50 | 50:50 | 220 | 231 | −52 | 65 |
| M4 | St4 | St/BA/MAA = 78/20/2 | 57 | 2EHA/BA = 50/50 | 50:50 | 221 | 250 | −52 | 57 |
| M5 | St5 | St/BA/4HBA = 80/15/5 | 55 | 2EHA/BA = 50/50 | 50:50 | 224 | 242 | −52 | 55 |
| M6 | St6 | St/BA/2EHA = 80/15/5 | 54 | 2EHA/BA = 50/50 | 50:50 | 225 | 233 | −52 | 54 |
| M7 | St7 | St/BA = 80/20 | 54 | 2EHA/BA = 50/50 | 50:50 | 224 | 243 | −52 | 54 |

TABLE 2-continued

Composite resin particle dispersion

| | | St resin | | | | Composite resin particles (or comparative resin particles) | | | |
|---|---|---|---|---|---|---|---|---|---|
| No. | St resin particle dispersion | Polymerization components | Tg °C. | Ac resin Polymerization components | St resin-to-Ac resin mass ratio (St:Ac) | D50v of resin particles nm | Mw (k) | Tg °C. | Tg °C. |
| M8 | St8 | St/BA/CEA = 77/20/3 | 54 | 2EHA/BA = 50/50 | 50:50 | 222 | 260 | −52 | 54 |
| M9 | St9 | St/BA/AA = 72/26/2 | 43 | 2EHA/BA = 50/50 | 50:50 | 223 | 251 | −52 | 43 |
| M10 | St10 | St/BA/AA = 68/30/2 | 35 | 2EHA/BA = 50/50 | 50:50 | 220 | 243 | −52 | 35 |
| M11 | St11 | St/2EHA = 80/20 | 56 | 2EHA/BA = 50/50 | 50:50 | 221 | 249 | −52 | 56 |
| M12 | St12 | St/2EHA/AA = 78/20/2 | 56 | 2EHA/BA = 50/50 | 50:50 | 227 | 237 | −52 | 56 |
| M13 | St12 | St/2EHA/AA = 78/20/2 | 56 | 2EHA/HA = 50/50 | 50:50 | 224 | 226 | −55 | 56 |
| M14 | St13 | St/EA/AA = 63/35/2 | 54 | 2EHA/PA = 50/50 | 50:50 | 224 | 243 | −45 | 54 |
| M15 | St1 | St/BA/AA = 78/20/2 | 54 | 2EHA/HA = 50/50 | 50:50 | 226 | 270 | −54 | 54 |
| M16 | St1 | St/BA/AA = 78/20/2 | 54 | 2EHA/BA = 90/10 | 50:50 | 224 | 264 | −51 | 54 |
| M17 | St1 | St/BA/AA = 78/20/2 | 54 | 2EHA/BA = 80/20 | 50:50 | 226 | 248 | −52 | 54 |
| M18 | St1 | St/BA/AA = 78/20/2 | 54 | 2EHA/BA = 70/30 | 50:50 | 226 | 260 | −52 | 54 |
| M19 | St1 | St/BA/AA = 78/20/2 | 54 | 2EHA/BA = 30/70 | 50:50 | 225 | 273 | −52 | 54 |
| M20 | St1 | St/BA/AA = 78/20/2 | 54 | 2EHA/BA = 20/80 | 50:50 | 224 | 233 | −52 | 54 |
| M21 | St1 | St/BA/AA = 78/20/2 | 54 | 2EHA/BA = 10/90 | 50:50 | 223 | 243 | −53 | 54 |

Preparation of Composite Resin Particle Dispersions (M28) to (M30)

Composite resin particle dispersions (M28) to (M30) containing composite resin particles having different weight average molecular weights are prepared as with the preparation of the composite resin particle dispersion (M1) except that the amount of ammonium persulfate is changed as indicated in Table 3.

TABLE 3

| | Ammonium persulfate |
|---|---|
| M28 | 3.0 parts |
| M29 | 5.0 parts |
| M30 | 7.5 parts |

The compositions and the physical properties of the composite resin particle dispersion (M28) etc., are indicated in Table 4. In Table 4, the monomers are abbreviated as follows.

Styrene: St, n-butyl acrylate: BA, acrylic acid: AA, 2-ethyhexyl acrylate: 2EHA

TABLE 4

Composite resin particle dispersion

| | | St resin | | | | Composite resin particles | | | |
|---|---|---|---|---|---|---|---|---|---|
| No. | St resin particle dispersion | Polymerization components | Tg °C. | Ac resin Polymerization components | St resin-to-Ac resin mass ratio (St:Ac) | D50v of resin particles nm | Mw (k) | Tg °C. | Tg °C. |
| M28 | St1 | St/BA/AA = 78/20/2 | 54 | 2EHA/BA = 50/50 | 50:50 | 219 | 150 | −52 | 54 |
| M29 | St1 | St/BA/AA = 78/20/2 | 54 | 2EHA/BA = 50/50 | 50:50 | 219 | 100 | −52 | 54 |
| M30 | St1 | St/BA/AA = 78/20/2 | 54 | 2EHA/BA = 50/50 | 50:50 | 219 | 60 | −52 | 54 |

Preparation of Pressure Sensitive Adhesive Particle
Preparation of Pressure Sensitive Adhesive Particle (1)
  Composite resin particle dispersion (M1): 504 parts
  Ion exchange water: 710 parts
  Anionic surfactant (DOWFAX 2A1 produced by The Dow Chemical Company): 1 part The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C./minute beyond 40° C. The particle diameter is measured every 10 minutes with MULTISIZER II (aperture diameter: 50 μm, produced by Beckman Coulter Inc.). The temperature is retained when the volume-average particle diameter reached 5.0 μm, and 170 parts of the styrene resin particle dispersion (St1) is added thereto over a period of 5 minutes. After completion of addition, a temperature of 50° C. is held for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having 15 μm opening to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, pressure sensitive adhesive base particles (1) is obtained. The volume-average particle diameter of the pressure sensitive adhesive base particles (1) is 8.0 μm.

One hundred parts of the pressure sensitive adhesive base particles (1) and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having 45 μm openings. As a result, pressure sensitive adhesive particles (1) are obtained.

Using the pressure sensitive adhesive particle (1) as a sample, the thermal behavior in the temperature range of −150° C. to 100° C. is analyzed with a differential scanning calorimeter (DSC-60A produced by Shimadzu Corporation). Two glass transition temperatures are observed. Table 5 indicates the glass transition temperatures.

The temperature T1 and the temperature T2 of the pressure sensitive adhesive particles (1) are measured by the aforementioned measuring method, and the pressure sensitive adhesive particles (1) satisfy formula 1, "10° C. T1−T2".

A cross section of the pressure sensitive adhesive particle (1) is observed with a scanning electron microscope (SEM). A sea-island structure is observed. The pressure sensitive adhesive particle (1) has a core in which island phases are present, and a shell layer in which no island phases are present. The sea phase contains a styrene resin, and the island phases contain a (meth)acrylate resin. The average diameter of the island phases is determined by the aforementioned measuring method. The average diameter of the island phases is indicated in Table 5.

The area ratio of the island phases in a cross section of the pressure sensitive adhesive particle (1) is in the range of 30% or more and 85% or less.

Preparation of Pressure Sensitive Adhesive Particles (2) to (21)

The pressure sensitive adhesive particles (2) to (21) are prepared as with the preparation of the pressure sensitive adhesive particle (1) except that the composite resin particle dispersion and the styrene resin particle dispersion are changed as indicated in Table 5.

The temperature T1 and the temperature T2 of the pressure sensitive adhesive particles (2) to (21) are measured by the aforementioned measuring method, and all of the pressure sensitive adhesive particles (2) to (21) satisfy formula 1, "10° C.≤T1−T2".

Cross sections of the pressure sensitive adhesive particles (2) to (21) are observed with a scanning electron microscope (SEM). A sea-island structure is observed. The pressure sensitive adhesive particles (2) to (21) have a core in which island phases are present, and a shell layer in which no island phases are present. The sea phase contains a styrene resin, and the island phases contain a (meth)acrylate resin. The average diameter of the island phases is determined by the aforementioned measuring method. The average diameter of the island phases is indicated in Table 5.

In the cross sections of the pressure sensitive adhesive particles (2) to (21), the area ratio of the island phases is in the range of 30% or more and 85% or less.

Preparation of Pressure Sensitive Adhesive Particles (28) to (30)

The pressure sensitive adhesive particles (28) to (30) are prepared as with the preparation of the pressure sensitive adhesive particle (1) except that the composite resin particle dispersion is changed as indicated in Table 6.

The temperature T1 and the temperature T2 of the pressure sensitive adhesive particles (28) to (30) are measured by the aforementioned measuring method, and all of the pressure sensitive adhesive particles (28) to (30) satisfy formula 1, "10° C.≤T1−T2".

Cross sections of the pressure sensitive adhesive particles (28) to (30) are observed with a scanning electron microscope (SEM). A sea-island structure is observed. The pressure sensitive adhesive particles (28) to (30) have a core in which island phases are present, and a shell layer in which no island phases are present. The sea phase contains a styrene resin, and the island phases contain a (meth)acrylate resin. The average diameter of the island phases is determined by the aforementioned measuring method. The average diameter of the island phases is indicated in Table 6.

In the cross sections of the pressure sensitive adhesive particles (28) to (30), the area ratio of the island phases is in the range of 30% or more and 85% or less.

Preparation of Pressure Sensitive Adhesive Particle (31)

Pressure sensitive adhesive base particles are prepared by the following crushing method.

The composite resin particle dispersion (M1) is dried to obtain composite resin particles (M31). The composite resin particles (M31) are heat-kneaded in an extruder at a set temperature of 100° C., cooled, and then crushed and classified to obtain pressure sensitive adhesive base particles (31) having a volume-average particle diameter of 8.0 μm.

One hundred parts of the pressure sensitive adhesive base particles (31) and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having 45 μm openings. As a result, pressure sensitive adhesive particles (31) are obtained.

Using the pressure sensitive adhesive particle (31) as a sample, the thermal behavior in the temperature range of −150° C. to 100° C. is analyzed with a differential scanning calorimeter (DSC-60A produced by Shimadzu Corporation). Two glass transition temperatures are observed. Table 6 indicates the glass transition temperatures.

The temperature T1 and the temperature T2 of the pressure sensitive adhesive particles (31) are measured by the aforementioned measuring method, and the pressure sensitive adhesive particles (31) satisfy formula 1, "10° C.≤T1−T2".

A cross section of the pressure sensitive adhesive particle (31) is observed with a scanning electron microscope (SEM). A sea-island structure is observed. The sea phase contains a styrene resin, and the island phases contain a (meth)acrylate resin. The average diameter of the island phases is determined by the aforementioned measuring method. The average diameter of the island phases is indicated in Table 6.

The area ratio of the island phases in a cross section of the pressure sensitive adhesive particle (31) is in the range of 30% or more and 85% or less.

Preparation of Pressure Sensitive Adhesive Particles (c1) to (c3) for Comparison The pressure sensitive adhesive particles (c1) to (c3) are prepared as with the preparation of the pressure sensitive adhesive particle (1) except that the composite resin particle dispersion and the styrene resin particle dispersion are changed as indicated in Table 5.

Evaluation of Pressure-Induced Phase Transition

The temperature difference (T1−T3), which is the indicator of how easily the pressure sensitive adhesive particles undergo pressure-induced phase transition, is determined. For each pressure sensitive adhesive particle sample, the temperature T1 and the temperature T3 are measured with a Flowtester (CFT-500 produced by Shimadzu Corporation), and the temperature difference (T1−T3) is calculated. Tables 5 and 6 indicate the temperature difference (T1−T3).

Evaluation of Adhesiveness

Postcard paper V424 produced by Fuji Xerox Co., Ltd., is prepared as a recording medium. By using an image forming apparatus DocuCentre C7550I produced by Fuji Xerox Co., Ltd., and commercially available yellow toner, magenta toner, cyan toner, and black toner products available from Fuji Xerox Co., Ltd., an image having an area density of 30% and including both black characters and a full-color photographic image is formed on one surface of a postcard sheet and is fixed.

Next, the pressure sensitive adhesive particles are sprayed onto the entire image-formed surface of the postcard sheet so that the amount of the pressure sensitive adhesive particles applied is 3 g/m$^2$, and the postcard sheet is passed through a belt roll-type fixing machine so as to fix the pressure sensitive adhesive particles onto the image-formed surface of the postcard sheet and form a layer of the pressure sensitive adhesive particles.

The postcard sheet having a layer of the pressure sensitive adhesive particles on the image-formed surface is folded in two with the image-formed surface facing inward by using a sealer, PRESSLE multi II produced by Toppan Forms Co., Ltd., and a pressure is applied to the bi-folded recording medium so as to bond the inner image-formed surfaces to each other at a pressure of 90 MPa.

Ten postcards are continuously formed by using the above-described apparatus under the above-described conditions by folding a postcard sheet in two with the image-formed surfaces facing inward and then bonding the image-formed surfaces of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/min, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Tables 5 and 6.

A: 0.8 N or more
B: 0.6 N or more but less than 0.8 N
C: 0.4 N or more but less than 0.6 N
D: 0.2 N or more but less than 0.4 N
E: Less than 0.2 N

TABLE 5

| Pressure sensitive adhesive particles | Composite resin particle dispersion | Core Polymerization components of St resin | Polymerization components of Ac resin | St resin-to-Ac resin mass ratio (St:Ac) | Shell layer St resin particle dispersion |
|---|---|---|---|---|---|
| c1 | cM1 | St/BA/AA = 78/20/2 | 2EHA = 100 | 50:50 | St1 |
| c2 | cM2 | St/BA/AA = 78/20/2 | BA = 100 | 50:50 | St1 |
| c3 | cM3 | St/2EHA/AA = 78/20/2 | BA = 100 | 50:50 | St12 |
| 1 | M1 | St/BA/AA = 78/20/2 | 2EHA/BA = 50/50 | 50:50 | St1 |
| 2 | M2 | St/BA/AA = 88/10/2 | 2EHA/BA = 50/50 | 50:50 | St2 |
| 3 | M3 | St/BA/AA = 83/15/2 | 2EHA/BA = 50/50 | 50:50 | St3 |
| 4 | M4 | St/BA/MAA = 78/20/2 | 2EHA/BA = 50/50 | 50:50 | St4 |
| 5 | M5 | St/BA/4HBA = 80/15/5 | 2EHA/BA = 50/50 | 50:50 | St5 |
| 6 | M6 | St/BA/2EHA = 80/15/5 | 2EHA/BA = 50/50 | 50:50 | St6 |
| 7 | M7 | St/BA = 80/20 | 2EHA/BA = 50/50 | 50:50 | St7 |
| 8 | M8 | St/BA/CEA = 77/20/3 | 2EHA/BA = 50/50 | 50:50 | St8 |
| 9 | M9 | St/BA/AA = 72/26/2 | 2EHA/BA = 50/50 | 50:50 | St9 |
| 10 | M10 | St/BA/AA = 68/30/2 | 2EHA/BA = 50/50 | 50:50 | St10 |
| 11 | M11 | St/2EHA = 80/20 | 2EHA/BA = 50/50 | 50:50 | St11 |
| 12 | M12 | St/2EHA/AA = 78/20/2 | 2EHA/BA = 50/50 | 50:50 | St12 |
| 13 | M13 | St/2EHA/AA = 78/20/2 | 2EHA/HA = 50/50 | 50:50 | St12 |
| 14 | M14 | St/EA/AA = 63/35/2 | 2EHA/PA = 50/50 | 50:50 | St13 |
| 15 | M15 | St/BA/AA = 78/20/2 | 2EHA/HA = 50/50 | 50:50 | St1 |
| 16 | M16 | St/BA/AA = 78/20/2 | 2EHA/BA = 90/10 | 50:50 | St1 |
| 17 | M17 | St/BA/AA = 78/20/2 | 2EHA/BA = 80/20 | 50:50 | St1 |
| 18 | M18 | St/BA/AA = 78/20/2 | 2EHA/BA = 70/30 | 50:50 | St1 |
| 19 | M19 | St/BA/AA = 78/20/2 | 2EHA/BA = 30/70 | 50:50 | St1 |
| 20 | M20 | St/BA/AA = 78/20/2 | 2EHA/BA = 20/80 | 50:50 | St1 |
| 21 | M21 | St/BA/AA = 78/20/2 | 2EHA/BA = 10/90 | 50:50 | St1 |

TABLE 5-continued

| Pressure sensitive adhesive particles | | | | | | | | |
|---|---|---|---|---|---|---|---|---|
| Pressure sensitive adhesive particles | Average diameter of island phases nm | Tg °C. | Difference in Tg °C. | T3 °C. | Pressure-induced phase transition (T1-T3) °C. | | | |
| Pressure sensitive adhesive particles | D50v μm | Average diameter of island phases nm | Tg °C. | Difference in Tg °C. | T3 °C. | Pressure-induced phase transition (T1-T3) °C. | Adhesiveness | Remarks |
| c1 | 8.0 | 600 | −50 | 54 | 104 | 95 | 3 | D | Comparative Example |
| c2 | 8.0 | 550 | −53 | 54 | 107 | 93 | 4 | D | Comparative Example |
| c3 | 11.0 | 570 | −53 | 56 | 109 | 93 | 4 | D | Comparative Example |
| 1 | 8.0 | 200 | −52 | 54 | 106 | 75 | 15 | A | Example |
| 2 | 11.0 | 250 | −52 | 76 | 128 | 70 | 13 | A | Example |
| 3 | 11.0 | 280 | −52 | 65 | 117 | 78 | 15 | A | Example |
| 4 | 11.0 | 240 | −52 | 57 | 109 | 70 | 10 | A | Example |
| 5 | 11.0 | 240 | −52 | 55 | 107 | 74 | 16 | A | Example |
| 6 | 11.0 | 250 | −52 | 54 | 106 | 73 | 14 | A | Example |
| 7 | 9.5 | 250 | −52 | 54 | 106 | 73 | 13 | A | Example |
| 8 | 9.5 | 250 | −52 | 54 | 106 | 75 | 10 | A | Example |
| 9 | 9.5 | 220 | −52 | 43 | 95 | 75 | 15 | A | Example |
| 10 | 9.5 | 230 | −52 | 35 | 87 | 73 | 15 | A | Example |
| 11 | 9.5 | 220 | −52 | 56 | 108 | 72 | 15 | A | Example |
| 12 | 9.5 | 230 | −52 | 56 | 108 | 75 | 20 | A | Example |
| 13 | 5.8 | 250 | −55 | 56 | 111 | 70 | 15 | A | Example |
| 14 | 5.8 | 350 | −45 | 54 | 99 | 80 | 5 | B | Example |
| 15 | 5.8 | 400 | −54 | 54 | 108 | 81 | 7 | B | Example |
| 16 | 8.0 | 400 | −51 | 54 | 105 | 80 | 10 | B | Example |
| 17 | 8.0 | 300 | −52 | 54 | 106 | 70 | 20 | A | Example |
| 18 | 8.0 | 250 | −52 | 54 | 106 | 75 | 15 | A | Example |
| 19 | 8.0 | 250 | −52 | 54 | 106 | 73 | 15 | A | Example |
| 20 | 8.0 | 300 | −52 | 54 | 106 | 75 | 20 | A | Example |
| 21 | 8.0 | 400 | −53 | 54 | 107 | 80 | 9 | B | Example |

TABLE 6

| | Core | | | | | |
|---|---|---|---|---|---|---|
| Pressure sensitive adhesive particles | Composite resin particle dispersion | Polymerization components St of resin | Polymerization components of Ac resin | St resin-to-Ac resin mass ratio (St:Ac) | Shell layer St resin particle dispersion | |
| 28 | M28 | St/BA/AA = 78/20/2 | 2EHA/BA = 50/50 | 50:50 | St1 | |
| 29 | M29 | St/BA/AA = 78/20/2 | 2EHA/BA = 50/50 | 50:50 | St1 | |
| 30 | M30 | St/BA/AA = 78/20/2 | 2EHA/BA = 50/50 | 50:50 | St1 | |
| 31 | M31 | St/BA/AA = 78/20/2 | 2EHA/BA = 50/50 | 50:50 | — | |

| Pressure sensitive adhesive particles | Pressure sensitive adhesive particles | | | | | | | |
|---|---|---|---|---|---|---|---|---|
| Pressure sensitive adhesive particles | D50v μm | Average diameter of island phases nm | Tg °C. | Difference in Tg °C. | T3 °C. | Pressure-induced phase transition (T1-T3) °C. | Adhesiveness | Remarks |
| 28 | 8.0 | 200 | −52 | 54 | 106 | 75 | 15 | A | Example |
| 29 | 8.0 | 200 | −52 | 54 | 106 | 75 | 15 | A | Example |
| 30 | 8.0 | 200 | −52 | 54 | 106 | 75 | 15 | B | Example |
| 31 | 8.0 | 400 | −52 | 54 | 106 | 75 | 7 | B | Example |

*Pressure sensitive adhesive particles (31) are produced by a crushing method by using, as a raw material, composite resin particles (M31) obtained by drying a composite resin particle dispersion (M1).

In the cross sections of the pressure sensitive adhesive particles (1) to (21) and (28) to (31), the area ratio of the island phases is in the range of 30% or more and 85% or less.

Preparation of Dispersion Containing Composite Resin Particles

Preparation of Composite Resin Particle Dispersion (M50)
- Styrene resin particle dispersion (St1): 1190 parts (solid content: 500 parts)
- 2-Ethylhexyl acrylate: 200 parts
- n-Butyl acrylate: 200 parts
- Ion exchange water: 1360 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask over a period of 60 minutes via a metering pump.

Subsequently, while slow stirring is continued, the polymerization flask is retained at 70° C. for 2 hours, and then a mixture of 85 parts of styrene and 15 parts of n-butyl acrylate is added dropwise over a period of 60 minutes. After dropwise addition, the mixture is retained at 75° C. for 3 hours and then returned to room temperature.

As a result, a composite resin particle dispersion (M50) that contains composite resin particles having a volume-average particle diameter (D50 v) of 223 nm and a weight-average molecular weight of 220000 as determined by GPC (UV detection) and that has a solid content of 32% is obtained.

The composite resin particle dispersion (M50) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 7 indicates the glass transition temperatures.

Preparation of Composite Resin Particle Dispersions (M51) to (M55)

Composite resin particle dispersions (M51) to (M55) are prepared as with the preparation of the composite resin particle dispersion (M50) except that the raw materials are changed as indicated in Table 7.

The compositions and the physical properties of the composite resin particle dispersion (M50) etc., are indicated in Table 7. In Table 7, the monomers are abbreviated as follows.

Styrene: St, n-butyl acrylate: BA, acrylic acid: AA, 2-ethyhexyl acrylate: 2EHA

Preparation of Pressure Sensitive Adhesive Particle

Preparation of Pressure Sensitive Adhesive Particles (50) to (55)

The pressure sensitive adhesive particles (50) to (55) are prepared as with the preparation of the pressure sensitive adhesive particle (1) except that the raw materials are changed as indicated in Table 8.

Using the pressure sensitive adhesive particles (50) to (55) as samples, the thermal behavior in the temperature range of −150° C. to 100° C. is analyzed with a differential scanning calorimeter (DSC-60A produced by Shimadzu Corporation). Two glass transition temperatures are observed. Table 8 indicates the glass transition temperatures.

The temperature T1 and the temperature T2 of the pressure sensitive adhesive particles (50) to (55) are measured by the aforementioned measuring method, and all of the pressure sensitive adhesive particles (50) to (55) satisfy formula 1, "10° C.≤T1−T2".

Cross sections of the pressure sensitive adhesive particles (50) to (55) are observed with a scanning electron microscope (SEM). A sea-island structure is observed. The pressure sensitive adhesive particles (50) to (55) have a core in which island phases are present, and a shell layer in which no island phases are present. The sea phase contains a styrene resin, and the island phases contain a (meth)acrylate resin. The average diameter of the island phases is determined by the aforementioned measuring method. The average diameter of the island phases is indicated in Table 8.

In the cross sections of the pressure sensitive adhesive particles (50) to (55), the area ratio of the island phases is in the range of 30% or more and 85% or less.

Evaluation of Pressure-Induced Phase Transition

For each pressure sensitive adhesive particle sample, the temperature T1 and the temperature T3 are measured with a Flowtester (CFT-500 produced by Shimadzu Corporation), and the temperature difference (T1−T3) is calculated. Table 8 indicates the temperature difference (T1−T3).

Evaluation of Adhesiveness

The adhesiveness is evaluated as with the pressure sensitive adhesive particles (1) etc., by the evaluation method described in "Evaluation of adhesiveness" described above. The results are indicated in Table 8.

TABLE 7

Composite resin particle dispersion

| | | St resin (1) | | | | | Composite resin particles | | | |
| | | | | | | St resin-to- | D50v of | | | |
| | St resin | | | Ac resin | St resin (2) | Ac resin | resin | Mw | | Tg |
| | particle | Polymerization | Tg | Polymerization | Polymerization | mass ratio | particles | (k) | | |
| No. | dispersion | components | ° C. | components | components | (St:Ac) | nm | — | ° C. | ° C. |
| M50 | St1 | St/BA/AA = 78/20/2 | 54 | 2EHA/BA = 50/50 | St/BA = 85/15 | 60:40 | 223 | 220 | −52 | 55 |
| M51 | St1 | St/BA/AA = 78/20/2 | 54 | 2EHA/BA = 50/50 | St/BA = 90/10 | 60:40 | 224 | 215 | −52 | 55 |
| M52 | St1 | St/BA/AA = 78/20/2 | 54 | 2EHA/BA = 70/30 | St/BA = 70/30 | 60:40 | 223 | 212 | −54 | 53 |
| M53 | St1 | St/BA/AA = 78/20/2 | 54 | 2EHA/BA = 30/70 | St/BA = 90/10 | 60:40 | 223 | 200 | −52 | 54 |
| M54 | St1 | St/BA/AA = 78/20/2 | 54 | 2EHA/BA = 60/40 | St/BA = 85/15 | 50:50 | 230 | 220 | −52 | 54 |
| M55 | St3 | St/BA/AA = 83/15/2 | 65 | 2EHA/BA = 60/40 | St/BA = 85/15 | 50:50 | 228 | 223 | −52 | 65 |

TABLE 8

| Pressure sensitive adhesive particles | Composite resin particle dispersion | Polymerization components of St resin (1) | Polymerization components of Ac resin | Polymerization components of St resin (2) | St resin-to-Ac resin mass ratio (St:Ac) | Shell layer St resin particle dispersion |
|---|---|---|---|---|---|---|
| | | | Core | | | |
| 50 | M50 | St/BA/AA = 78/20/2 | 2EHA/BA = 50/50 | St/BA = 85/15 | 60:40 | St1 |
| 51 | M51 | St/BA/AA = 78/20/2 | 2EHA/BA = 50/50 | St/BA = 90/10 | 60:40 | St1 |
| 52 | M52 | St/BA/AA = 78/20/2 | 2EHA/BA = 70/30 | St/BA = 70/30 | 60:40 | St1 |
| 53 | M53 | St/BA/AA = 78/20/2 | 2EHA/BA = 30/70 | St/BA = 90/10 | 60:40 | St1 |
| 54 | M54 | St/BA/AA = 78/20/2 | 2EHA/BA = 60/40 | St/BA = 85/15 | 50:50 | St1 |
| 55 | M55 | St/BA/AA = 83/15/2 | 2EHA/BA = 60/40 | St/BA = 85/15 | 50:50 | St1 |

Pressure sensitive adhesive particles

| Pressure sensitive adhesive particles | D50v μm | Average diameter of island phases nm | Tg °C | Tg °C | Difference in Tg °C | T3 °C | Pressure-induced phase transition (T1-T3) °C | Adhesiveness | Remarks |
|---|---|---|---|---|---|---|---|---|---|
| 50 | 8.0 | 250 | −52 | 55 | 107 | 75 | 10 | A | Example |
| 51 | 8.0 | 250 | −52 | 55 | 107 | 75 | 10 | A | Example |
| 52 | 8.0 | 250 | −54 | 53 | 107 | 74 | 13 | A | Example |
| 53 | 8.0 | 250 | −52 | 54 | 106 | 73 | 13 | A | Example |
| 54 | 8.0 | 270 | −52 | 54 | 106 | 78 | 15 | A | Example |
| 55 | 8.0 | 270 | −52 | 65 | 117 | 74 | 15 | A | Example |

In the cross sections of the pressure sensitive adhesive particles and (50) to (55), the area ratio of the island phases is in the range of 30% or more and 85% or less.

Producing Printed Material by Electrophotographic Method

Into a V-type blender, 10 parts of any one of the pressure sensitive adhesive particles (1) to (21), (28) to (31), (c1) to (c3), and (50) to (55) and 100 parts of the following resin-coated carrier (1) are placed, and the resulting mixture is stirred for 20 minutes. Then the mixture is screened through a vibrating screen having 212 µm openings to obtain a developers (1) to (21), (28) to (31), (c1) to (c3), and (50) to (55).

Resin-Coated Carrier (1)

Mn—Mg—Sr ferrite particles (average particle diameter: 40 µm): 100 parts
Toluene: 14 parts
Polymethyl methacrylate: 2 parts
Carbon black (VXC72 produced by Cabot Corporation): 0.12 parts
Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. This dispersion and the ferrite particles are placed in a vacuum deaerator-type kneader, and the resulting mixture is dried at a reduced pressure under stirring to obtain a resin-coated carrier (1).

An apparatus of a type illustrated in FIG. 4 is prepared as the apparatus for producing a printed material. In other words, an apparatus for producing a printed material, the apparatus being equipped with a five-stand-tandem intermediate transfer-type printing unit that performs application of the pressure sensitive adhesive particles of the exemplary embodiment and formation of color images on a recording medium, and a pressure bonding unit that has a folding device and a pressurizing device is prepared.

The developer (or comparative developer) of this exemplary embodiment, a yellow developer, a magenta developer, a cyan developer, and a black developer are respectively placed in five developing devices in the printing unit. Commercially available products produced by Fuji Xerox Co., Ltd., are used as the developers of respective colors such as yellow.

Postcard paper V424 produced by Fuji Xerox Co., Ltd. is prepared as a recording medium.

The image to be formed on the postcard paper is an image having an area density of 30% and including both black characters and a full-color photographic image. The image is formed on one surface of the postcard sheet.

The amount of the pressure sensitive adhesive particles of the exemplary embodiment (or comparative pressure sensitive adhesive particles) applied is 3 g/m² in an image-formed region of an image-formed surface of the postcard sheet.

The folding device is a device that folds the postcard sheet in two such that the surface on which the image is formed is arranged on the inner side.

The pressurizing device is to apply a pressure of 90 MPa.

Ten postcards are continuously formed by using the above-described apparatus under the above-described conditions by folding a postcard sheet in two with the image-formed surface facing inward and then bonding the image-formed surfaces of the flaps of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/min, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Tables 9, 10, and 11.

A: 0.8 N or more
B: 0.6 N or more but less than 0.8 N

C: 0.4 N or more but less than 0.6 N
D: 0.2 N or more but less than 0.4 N
E: Less than 0.2 N

TABLE 9

| Developer | Pressure sensitive adhesive particles | Adhesiveness | Remarks |
|---|---|---|---|
| c1 | c1 | D | Comparative Example |
| c2 | c2 | D | Comparative Example |
| c3 | c3 | D | Comparative Example |
| 1 | 1 | A | Example |
| 2 | 2 | A | Example |
| 3 | 3 | A | Example |
| 4 | 4 | A | Example |
| 5 | 5 | A | Example |
| 6 | 6 | A | Example |
| 7 | 7 | A | Example |
| 8 | 8 | A | Example |
| 9 | 9 | A | Example |
| 10 | 10 | A | Example |
| 11 | 11 | A | Example |
| 12 | 12 | A | Example |
| 13 | 13 | A | Example |
| 14 | 14 | B | Example |
| 15 | 15 | B | Example |
| 16 | 16 | B | Example |
| 17 | 17 | A | Example |
| 18 | 18 | A | Example |
| 19 | 19 | A | Example |
| 20 | 20 | A | Example |
| 21 | 21 | B | Example |

TABLE 10

| Developer | Pressure sensitive adhesive particles | Adhesiveness | Remarks |
|---|---|---|---|
| 28 | 28 | A | Example |
| 29 | 29 | A | Example |
| 30 | 30 | B | Example |
| 31 | 31 | B | Example |

TABLE 11

| Developer | Pressure sensitive adhesive particles | Adhesiveness | Remarks |
|---|---|---|---|
| 50 | 50 | A | Example |
| 51 | 51 | A | Example |
| 52 | 52 | A | Example |
| 53 | 53 | A | Example |
| 54 | 54 | A | Example |
| 55 | 55 | A | Example |

Examination on Features of Island Phases

Preparation of Dispersion Containing Composite Resin Particles

Composite resin particle dispersions (M60) to (M69) are prepared as with the preparation of the composite resin particle dispersion (M1) except that the St resin to Ac resin mass ratio was change as indicated in Table 12.

The compositions and the physical properties of the composite resin particle dispersion (M60) etc., are indicated in Table 12. In Table 12, the monomers are abbreviated as follows.

Styrene: St, n-butyl acrylate: BA, acrylic acid: AA, 2-ethyhexyl acrylate: 2EHA

TABLE 12

| | Composite resin particle dispersion | | | | | | |
|---|---|---|---|---|---|---|---|
| | | St resin | | | | Composite resin particles | |
| | | | | | | St resin-to-Ac resin mass ratio | Tg |
| No. | St resin particle dispersion | Polymerization components | Tg °C. | | Ac resin Polymerization components | (St:Ac) | °C. °C. |
| M1 | St1 | St/BA/AA = 78/20/2 | 54 | | 2EHA/BA = 50/50 | 50:50 | −52  54 |
| M60 | St1 | St/BA/AA = 78/20/2 | 54 | | 2EHA/BA = 50/50 | 95:5 | −52  54 |
| M61 | St1 | St/BA/AA = 78/20/2 | 54 | | 2EHA/BA = 50/50 | 90:10 | −52  54 |
| M62 | St1 | St/BA/AA = 78/20/2 | 54 | | 2EHA/BA = 50/50 | 85:15 | −52  54 |
| M63 | St1 | St/BA/AA = 78/20/2 | 54 | | 2EHA/BA = 50/50 | 80:20 | −52  54 |
| M64 | St1 | St/BA/AA = 78/20/2 | 54 | | 2EHA/BA = 50/50 | 70:30 | −52  54 |
| M65 | St1 | St/BA/AA = 78/20/2 | 54 | | 2EHA/BA = 50/50 | 60:40 | −52  54 |
| M66 | St1 | St/BA/AA = 78/20/2 | 54 | | 2EHA/BA = 50/50 | 39:61 | −52  54 |
| M67 | St1 | St/BA/AA = 78/20/2 | 54 | | 2EHA/BA = 50/50 | 33:67 | −52  54 |
| M68 | St1 | St/BA/AA = 78/20/2 | 54 | | 2EHA/BA = 50/50 | 30:70 | −52  54 |
| M69 | St1 | St/BA/AA = 78/20/2 | 54 | | 2EHA/BA = 50/50 | 26:74 | −52  54 |

Preparation of Pressure Sensitive Adhesive Particles (60) to (74) and (c4) to (c7)

The pressure sensitive adhesive base particles are prepared as with the preparation of the pressure sensitive adhesive base particle (1) except that the production process is changed as indicated in Table 13.

One hundred parts of the pressure sensitive adhesive base particles and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having 45 μm openings. As a result, pressure sensitive adhesive particles are obtained.

Using the pressure sensitive adhesive particles (60) to (74) as samples, the thermal behavior in the temperature range of −150° C. to 100° C. is analyzed with a differential scanning calorimeter (DSC-60A produced by Shimadzu Corporation). Two glass transition temperatures are observed from each of the samples. The two glass transition temperatures are, respectively, −52° C. and 54° C.

The temperature T1 and the temperature T2 of the pressure sensitive adhesive particles (60) to (74) are measured by the aforementioned measuring method, and all of the pressure sensitive adhesive particles (60) to (74) satisfy formula 1, "10° C.≤T1−T2".

Cross sections of the pressure sensitive adhesive particles (60) to (74) are observed with a scanning electron microscope (SEM). A sea-island structure is observed. The pressure sensitive adhesive particles (60) to (74) have a core in which island phases are present, and a shell layer in which no island phases are present. The sea phase contains a styrene resin, and the island phases contain a (meth)acrylate resin. The average diameter of the island phases is determined by the aforementioned measuring method. The average diameter of the island phases and the like are indicated in Table 14.

Evaluation of Adhesiveness

Postcard paper V424 produced by Fuji Xerox Co., Ltd. is prepared as a recording medium. By using an image forming apparatus DocuCentre C7550I produced by Fuji Xerox Co., Ltd., and commercially available yellow toner, magenta toner, cyan toner, and black toner products available from Fuji Xerox Co., Ltd., an image having an area density of 30% and including both black characters and a full-color photographic image is formed on one surface of a postcard sheet and is fixed.

Next, the pressure sensitive adhesive particles are sprayed onto the entire image-formed surface of the postcard sheet so that the amount of the pressure sensitive adhesive particles applied is 3 g/m², and the postcard sheet is passed through a belt roll-type fixing machine so as to fix the pressure sensitive adhesive particles onto the image-formed surface of the postcard sheet and form a layer of the pressure sensitive adhesive particles.

The postcard sheet having a layer of the pressure sensitive adhesive particles on the image-formed surface is folded in two with the image-formed surface facing inward by using a sealer, PRESSLE multi II produced by Toppan Forms Co., Ltd., and a pressure is applied to the bi-folded recording medium so as to bond the inner image-formed surfaces to each other at a pressure of 90 MPa.

Ten postcards are continuously formed by using the above-described apparatus under the above-described conditions by folding a postcard sheet in two with the image-formed surfaces facing inward and then bonding the image-formed surfaces of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/min, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Table 14.

A: 0.8 N or more
B: 0.6 N or more but less than 0.8 N
C: 0.4 N or more but less than 0.6 N
D: 0.2 N or more but less than 0.4 N
E: Less than 0.2 N

TABLE 13

| | | | Base particle production process | | | | | | |
|---|---|---|---|---|---|---|---|---|---|
| | | | | Core | | Aggregated particle forming step | | Fusing and coalescing step | |
| Pressure sensitive adhesive particles | Pressure sensitive adhesive base particles | Shell St resin particle dispersion | Composite resin particle dispersion | St resin-to-Ac resin mass ratio (St:Ac) | Temperature elevation rate up to 40° C. ° C./min | Temperature elevation rate beyond 40° C. ° C./min | Temperature elevation rate up to 90° C. ° C./min | Retention time at 90° C. min | Remarks |
| c4 | c4 | St1 | M60 | 95:5 | 0.20 | 0.05 | 1.0 | 600 | Comparative Example |
| c5 | c5 | St1 | M61 | 90:10 | 0.20 | 0.05 | 1.0 | 600 | Comparative Example |
| 60 | 60 | St1 | M62 | 85:15 | 0.20 | 0.05 | 1.0 | 600 | Example |
| 61 | 61 | St1 | M62 | 85:15 | 0.05 | 0.01 | 0.1 | 1200 | Example |
| 62 | 62 | St1 | M63 | 80:20 | 0.20 | 0.05 | 1.0 | 600 | Example |
| 63 | 63 | St1 | M64 | 70:30 | 0.20 | 0.05 | 1.0 | 600 | Example |
| 64 | 64 | St1 | M65 | 60:40 | 0.20 | 0.05 | 1.0 | 600 | Example |
| 65 | 65 | St1 | M1 | 50:50 | 0.20 | 0.05 | 1.0 | 600 | Example |
| 66 | 66 | St1 | M66 | 39:61 | 0.20 | 0.05 | 1.0 | 600 | Example |
| 67 | 67 | St1 | M67 | 33:67 | 0.20 | 0.05 | 1.0 | 600 | Example |
| 68 | 68 | St1 | M67 | 33:67 | 0.20 | 0.05 | 1.0 | 600 | Example |
| 69 | 69 | St1 | M67 | 33:67 | 0.20 | 0.05 | 1.0 | 600 | Example |
| 70 | 70 | St1 | M67 | 33:67 | 0.40 | 0.10 | 1.0 | 300 | Example |
| c6 | c6 | St1 | M68 | 30:70 | 0.20 | 0.05 | 1.0 | 600 | Comparative |

TABLE 13-continued

| | | | | | Base particle production process | | | | |
| | | | | Core | | Aggregated particle forming step | | Fusing and coalescing step | |
| Pressure sensitive adhesive particles | Pressure sensitive adhesive base particles | Shell St resin particle dispersion — | Composite resin particle dispersion — | St resin-to-Ac resin mass ratio (St:Ac) — | Temperature elevation rate up to 40° C. ° C./min | Temperature elevation rate beyond 40° C. ° C./min | Temperature elevation rate up to 90° C. ° C./min | Retention time at 90° C. min | Remarks |
|---|---|---|---|---|---|---|---|---|---|
| c7 | c7 | St1 | M69 | 26:74 | 0.20 | 0.05 | 1.0 | 600 | Example Comparative Example |
| 71 | 71 | St1 | M1 | 50:50 | 0.20 | 0.01 | 1.0 | 600 | Example |
| 72 | 72 | St1 | M1 | 50:50 | 0.20 | 0.05 | 0.1 | 600 | Example |
| 73 | 73 | St1 | M1 | 50:50 | 0.05 | 0.01 | 0.1 | 1200 | Example |
| 74 | 74 | St1 | M1 | 50:50 | 0.40 | 0.10 | 1.0 | 300 | Example |

TABLE 14

| | | | | | | Island phases | | | | | | |
| | | | | | | First region Island phase area ratio As1 | Second region Island phase area ratio As2 | Third region Island phase area ratio As3 | | | | |
| Pressure sensitive adhesive particles | Pressure sensitive adhesive base particles | D50v μm | Island phase area ratio % | Average diameter of island phases nm | Average number of island phases — | % | % | % | As2/As1 — | As3/As1 — | Performance evaluation Adhesiveness — | Remarks |
|---|---|---|---|---|---|---|---|---|---|---|---|---|
| c4 | c4 | 9.5 | 15 | 250 | 173 | 18 | 15 | 12 | 0.83 | 0.67 | E | Comparative Example |
| c5 | c5 | 9.5 | 24 | 300 | 193 | 24 | 29 | 19 | 1.20 | 0.80 | D | Comparative Example |
| 60 | 60 | 9.5 | 31 | 300 | 249 | 28 | 33 | 33 | 1.17 | 1.17 | B | Example |
| 61 | 61 | 5.5 | 31 | 500 | 25 | 29 | 33 | 31 | 1.16 | 1.06 | C | Example |
| 62 | 62 | 9.5 | 38 | 300 | 305 | 42 | 32 | 40 | 0.77 | 0.95 | A | Example |
| 63 | 63 | 9.5 | 50 | 300 | 401 | 50 | 53 | 48 | 1.05 | 0.95 | A | Example |
| 64 | 64 | 9.5 | 60 | 280 | 553 | 69 | 51 | 60 | 0.74 | 0.87 | A | Example |
| 65 | 65 | 9.5 | 70 | 270 | 694 | 67 | 70 | 74 | 1.05 | 1.11 | A | Example |
| 66 | 66 | 9.5 | 80 | 270 | 793 | 74 | 86 | 80 | 1.15 | 1.08 | A | Example |
| 67 | 67 | 9.5 | 85 | 250 | 983 | 81 | 94 | 81 | 1.16 | 1.00 | A | Example |
| 68 | 68 | 5.5 | 85 | 250 | 275 | 78 | 83 | 94 | 1.07 | 1.20 | A | Example |
| 69 | 69 | 8.0 | 85 | 250 | 666 | 85 | 77 | 94 | 0.90 | 1.10 | A | Example |
| 70 | 70 | 14.7 | 85 | 200 | 3994 | 87 | 82 | 86 | 0.95 | 0.99 | B | Example |
| c6 | c6 | 9.5 | 87 | 260 | 930 | 87 | 96 | 78 | 1.10 | 0.90 | Breaking | Comparative Example |
| c7 | c7 | 9.5 | 91 | 200 | 1644 | 86 | 96 | 91 | 1.11 | 1.05 | Breaking | Comparative Example |
| 71 | 71 | 9.5 | 71 | 320 | 501 | 67 | 67 | 78 | 1.00 | 1.16 | A | Example |
| 72 | 72 | 9.5 | 69 | 400 | 312 | 76 | 66 | 66 | 0.86 | 0.86 | A | Example |
| 73 | 73 | 9.5 | 70 | 500 | 202 | 70 | 74 | 67 | 1.05 | 0.95 | A | Example |
| 74 | 74 | 9.5 | 71 | 200 | 1282 | 70 | 70 | 73 | 1.01 | 1.05 | A | Example |

Examination of Divalent Metal Concentration
Preparation of Pressure Sensitive Adhesive Particles (80) to (87)

The pressure sensitive adhesive base particles are prepared as with the preparation of the pressure sensitive adhesive base particle (1) except that the aggregating agent is further added as indicated in Table 15 in the fusing and coalescing step.

One hundred parts of the pressure sensitive adhesive base particles and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having 45 μm openings. As a result, pressure sensitive adhesive particles are obtained.

Using the pressure sensitive adhesive particles (80) to (87) as samples, the thermal behavior in the temperature range of −150° C. to 100° C. is analyzed with a differential scanning calorimeter (DSC-60A produced by Shimadzu Corporation). Two glass transition temperatures are observed from each of the samples. The two glass transition temperatures are, respectively, −52° C. and 54° C.

The temperature T1 and the temperature T2 of the pressure sensitive adhesive particles (80) to (87) are measured by the aforementioned measuring method, and all of the pressure sensitive adhesive particles (80) to (87) satisfy formula 1, "10° C.≤T1−T2".

Cross sections of the pressure sensitive adhesive particles (80) to (87) are observed with a scanning electron microscope (SEM). A sea-island structure is observed. The pressure sensitive adhesive particles (80) to (87) have a core in which island phases are present, and a shell layer in which no island phases are present. The sea phase contains a styrene resin, and the island phases contain a (meth)acrylate resin. In the cross sections of the pressure sensitive adhesive particles (80) to (87), the area ratio of the island phases is in the range of 30% or more and 85% or less.

Evaluation of Adhesiveness

The adhesiveness is evaluated by the evaluation method described in "Evaluation of adhesiveness" described above. The results are indicated in Table 15.

TABLE 15

| Pressure sensitive adhesive particles | Pressure sensitive adhesive base particles | Aggregating agent Type | Amount added Parts by mass | Metal concentration in particle surface layer Al (Als) % | Mg % | Ca % | Total of three elements (Mes) % |
|---|---|---|---|---|---|---|---|
| 80 | 80 | Aluminum sulfate | 23.0 | 0.28 | 0.01 | 0.01 | 0.30 |
| 81 | 81 | Aluminum sulfate | 11.5 | 0.11 | 0.00 | 0.00 | 0.11 |
| 82 | 82 | Aluminum sulfate | 0.0 | 0.04 | 0.01 | 0.00 | 0.05 |
| 83 | 83 | Aluminum chloride | 23.0 | 0.27 | 0.01 | 0.00 | 0.28 |
| 84 | 84 | Polyaluminum chloride | 23.0 | 0.29 | 0.00 | 0.01 | 0.30 |
| 85 | 85 | Polyaluminum hydroxide | 23.0 | 0.26 | 0.00 | 0.01 | 0.27 |
| 86 | 86 | Magnesium chloride | 23.0 | 0.04 | 0.25 | 0.00 | 0.29 |
| 87 | 87 | Calcium chloride | 23.0 | 0.04 | 0.00 | 0.27 | 0.31 |

| Pressure sensitive adhesive particles | Metal concentration in entire particle Al (Alt) % | Mg % | Ca % | Total of three elements (Met) % | Uneven distribution of metal Mes/Met | Als/Alt | Performance evaluation Adhesiveness | Remarks |
|---|---|---|---|---|---|---|---|---|
| 80 | 0.48 | 0.01 | 0.01 | 0.50 | 0.60 | 0.58 | A | Example |
| 81 | 0.36 | 0.00 | 0.01 | 0.37 | 0.30 | 0.31 | A | Example |
| 82 | 0.24 | 0.01 | 0.00 | 0.25 | 0.20 | 0.17 | B | Example |
| 83 | 0.48 | 0.01 | 0.00 | 0.49 | 0.57 | 0.56 | A | Example |
| 84 | 0.49 | 0.00 | 0.01 | 0.50 | 0.60 | 0.59 | A | Example |
| 85 | 0.48 | 0.00 | 0.01 | 0.49 | 0.55 | 0.54 | A | Example |
| 86 | 0.23 | 0.28 | 0.00 | 0.51 | 0.57 | 0.17 | A | Example |
| 87 | 0.23 | 0.00 | 0.29 | 0.52 | 0.60 | 0.17 | A | Example |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A pressure sensitive adhesive particle comprising:
a styrene resin that contains, as polymerization components, styrene and a vinyl monomer other than styrene; and
a (meth)acrylate resin that consists of, as polymerization components, a first alkyl(meth)acrylate and a second alkyl(meth)acrylate, and a mass ratio between the first alkyl(meth)acrylate and the second alkyl(meth)acrylate in the (meth)acrylate resin is from 80:20 to 20:80, wherein:
a volume-average particle diameter (D50 v) of the pressure sensitive adhesive base particle is from 6 μm to 12 μm;
the pressure sensitive adhesive particle has a core that contains the styrene resin and the (meth)acrylate resin, and a shell layer that covers the core; the core has a sea phase that contains the styrene resin, and island phases that are dispersed in the sea phase and contain the (meth)acrylate resin;
the pressure sensitive adhesive particle has at least two glass transition temperatures, and a difference between the lowest glass transition temperature and the highest glass transition temperature is 30° C. or more; and
in a cross section of the pressure sensitive adhesive particle, an area ratio of the island phases is 30% or more and 85% or less.

2. The pressure sensitive adhesive particle according to claim 1, wherein, in the cross section of the pressure sensitive adhesive particle, the area ratio of the island phases is 35% or more and 80% or less.

3. The pressure sensitive adhesive particle according to claim 1, wherein the island phases have an average diameter of 200 nm or more and 500 nm or less.

4. The pressure sensitive adhesive particle according to claim 1, wherein, in the cross section of the pressure sensitive adhesive particle, an average number of the island phases per pressure sensitive adhesive particle is 20 or more and 4000 or less.

5. The pressure sensitive adhesive particle according to claim 4, wherein, in the cross section of the pressure sensitive adhesive particle, the average number of the island phases per pressure sensitive adhesive particle is 35 or more and 2000 or less.

6. The pressure sensitive adhesive particle according to claim 1, wherein, in the cross section of the pressure sensitive adhesive particle, the island phases satisfy requirements (1) and (2) below:

Requirement (1): An area ratio As1(%) of the island phases in a first region and an area ratio As2(%) of the island phases in a second region have a relationship of $0.70 \leq As2/As1 \leq 1.20$ Requirement (2): The area ratio As1(%) of the island phases in the first region and an area ratio As3(%) of the island phases in a third region have a relationship of $0.70 \leq As3/As1 \leq 1.20$, and wherein the first region, the second region, and the third region are regions in a cross section of the pressure sensitive adhesive particle and are formed by dividing a portion that spans from a position 550 nm deep from a surface to a center of gravity equally into three parts that respectively correspond to the first region, the second region, and the third region in order of proximity to the center of gravity.

7. The pressure sensitive adhesive particle according to claim 1, wherein a total concentration of Al, Mg, and Ca contained in the pressure sensitive adhesive particle satisfies requirement (3) below:

Requirement (3): When a volume-average particle diameter of the pressure sensitive adhesive particle is represented by D (μm), a total concentration Mes (%) of Al, Mg, and Ca as measured by energy-dispersive X-ray spectroscopy at an acceleration voltage of $0.6 \times D+0.9$ (kV) and a total concentration Met (%) of Al, Mg, and Ca as measured by energy-dispersive X-ray spectroscopy at an acceleration voltage of $1.8 \times D+4.9$ (kV) have a relationship of $0.15 \leq Mes/Met < 0.60$.

8. The pressure sensitive adhesive particle according to claim 1, wherein a concentration of Al contained in the pressure sensitive adhesive particle satisfies requirement (4) below:

Requirement (4): When a volume-average particle diameter of the pressure sensitive adhesive particle is represented by D (μm), an Al concentration Als (%) as measured by energy-dispersive X-ray spectroscopy at an acceleration voltage of $0.6 \times D+0.9$ (kV) and an Al concentration Alt (%) as measured by energy-dispersive X-ray spectroscopy at an acceleration voltage of $1.8 \times D+4.9$ (kV) have a relationship of $0.15 \leq Als/Alt < 0.60$.

9. The pressure sensitive adhesive particle according to claim 1, wherein the shell layer contains the styrene resin.

10. A cartridge detachably attachable to an apparatus for producing a printed material, the cartridge comprising:
the pressure sensitive adhesive particle according to claim 1.

11. An apparatus for producing a printed material, the apparatus comprising:
an applying unit that stores the pressure sensitive adhesive particle according to claim 1 and applies the pressure sensitive adhesive particle to a recording medium; and
a pressure bonding unit that folds the recording medium and pressure-bonds the folded recording medium or that stacks another recording medium on the recording medium and pressure-bonds the stacked recording media.

12. The apparatus for producing a printed material according to claim 11, further comprising a color image forming unit that forms a color image on the recording medium by using a coloring material.

13. A method for producing a printed material, the method comprising:
applying the pressure sensitive adhesive particle according to claim 1 to a recording medium; and
folding the recording medium and pressure-bonding the folded recording medium, or stacking another recording medium on the recording medium and pressure-bonding the stacked recording media.

14. The method for producing a printed material according to claim 13, the method further comprising forming a color image on the recording medium by using a coloring material.

15. A printed material comprising:
a folded recording medium having opposing surfaces bonded with the pressure sensitive adhesive particle according to claim 1.

16. A printed material comprising:
a plurality of recording media stacked on top of each other, wherein opposing surfaces of the recording media are bonded with the pressure sensitive adhesive particle according to claim 1.

17. A sheet for producing a printed material, the sheet comprising:
a substrate; and
the pressure sensitive adhesive particle according to claim 1 applied to the substrate.

18. A method for producing a sheet for producing a printed material, the method comprising:
applying the pressure sensitive adhesive particle according to claim 1 to a substrate.

19. A pressure sensitive adhesive particle comprising:
a styrene resin that contains, as polymerization components, styrene and a vinyl monomer other than styrene; and
a (meth)acrylate resin that consists of, as polymerization components, a first alkyl(meth)acrylate and a second alkyl(meth)acrylate, and a mass ratio between the first alkyl(meth)acrylate and the second alkyl (meth)acrylate in the (meth)acrylate resin is from 80:20 to 20:80, wherein:
a weight-average molecular weight of the (meth)acrylate resin is from 50,000 to 200,000;
the pressure sensitive adhesive particle has a core that contains the styrene resin and the (meth)acrylate resin, and a shell layer that covers the core; the core has a sea phase that contains the styrene resin, and island phases that are dispersed in the sea phase and contain the (meth)acrylate resin;
the pressure sensitive adhesive particle has at least two glass transition temperatures, and a difference between the lowest glass transition temperature and the highest glass transition temperature is 30° C. or more; and
in a cross section of the pressure sensitive adhesive particle, an area ratio of the island phases is 30% or more and 85% or less.

20. The pressure sensitive adhesive particle according to claim 19, wherein
the weight-average molecular weight of the (meth)acrylate resin is from 51,000 to 200,000.

* * * * *